US008693288B1

United States Patent
O'Brien, Jr. et al.

(10) Patent No.: US 8,693,288 B1
(45) Date of Patent: Apr. 8, 2014

(54) METHOD FOR DETECTING A RANDOM PROCESS IN A CONVEX HULL VOLUME

(75) Inventors: Francis J. O'Brien, Jr., Newport, RI (US); Aimee M. Ross, New Bedford, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 253 days.

(21) Appl. No.: 13/317,035

(22) Filed: Oct. 4, 2011

(51) Int. Cl.
*G06E 1/00* (2006.01)

(52) U.S. Cl.
USPC .......................................................... 367/135

(58) Field of Classification Search
USPC ........ 367/135, 131; 702/181, 179, 143; 703/2
See application file for complete search history.

(56) References Cited

U.S. PATENT DOCUMENTS

| | | | | |
|---|---|---|---|---|
| 5,144,595 A * | 9/1992 | Graham et al. | ................ | 367/135 |
| 5,612,928 A * | 3/1997 | Haley et al. | ..................... | 367/11 |
| 5,675,553 A * | 10/1997 | O'Brien et al. | ............... | 367/135 |
| 5,703,906 A * | 12/1997 | O'Brien et al. | ............... | 375/316 |
| 5,757,675 A * | 5/1998 | O'Brien, Jr. | .................. | 702/156 |
| 5,781,460 A * | 7/1998 | Nguyen et al. | ................ | 708/300 |
| 5,838,816 A * | 11/1998 | Holmberg | ..................... | 367/131 |
| 5,963,591 A * | 10/1999 | O'Brien et al. | ............... | 375/227 |
| 5,966,414 A * | 10/1999 | O'Brien, Jr. | .................. | 375/346 |
| 6,397,234 B1 * | 5/2002 | O'Brien et al. | ............... | 708/200 |
| 6,411,566 B1 * | 6/2002 | Katz et al. | ..................... | 367/135 |
| 6,466,516 B1 * | 10/2002 | O'Brien et al. | ............... | 367/131 |
| 6,967,899 B1 * | 11/2005 | O'Brien et al. | ............... | 367/131 |
| 6,980,926 B1 * | 12/2005 | O'Brien, Jr. | .................. | 702/179 |
| 6,983,222 B1 * | 1/2006 | O'Brien, Jr. | .................. | 702/181 |
| 7,277,573 B1 * | 10/2007 | O'Brien, Jr. | .................. | 382/154 |
| 7,409,323 B1 * | 8/2008 | O'Brien, Jr. | ..................... | 703/2 |

* cited by examiner

*Primary Examiner* — Daniel Pihulic
(74) *Attorney, Agent, or Firm* — James M. Kasischke; Michael P. Stanley

(57) ABSTRACT

A method is provided for characterizing data sets containing data points. The method can characterize the data sets as random or as non-random. In the method, a convex hull envelope is constructed which contains the data points and passes through at least four non-coplanar data points. The convex hull envelope is partitioned into cells. The method classifies the data set as a sized sample. Based on the classification, a predetermined set of tests is selected for operating on the data set.

9 Claims, 5 Drawing Sheets

METHOD FOR DETECTING A RANDOM PROCESS IN A CONVEX HULL VOLUME

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates to the field of sonar signal processing and more particularly, to detecting the presence or absence of spatial random processes in physical phenomena.

2. Description of the Prior Art

In some cases, it can be important or critical to know with a high probability whether data received by a sonar system is simply random noise (which may be a false alarm) or is more likely due to the detection of a vessel of interest. In either situation, it is critical to make a determination as quickly as possible.

Naval sonar systems require that signals be categorized according to structure (i.e., periodic, transient, random or chaotic). A variety of large sample data processing methods such as spectral analysis, correlogram plots, and the like are available. However, a number of scenarios may also or only comprise small samples. These small samples include loss, or intermittent contact, transients, equipment failure, own ship maneuver, and the like. The existence of such sparse data sets requires methods that are appropriate for reliable and valid processing.

As such, there is a need for sparse data set methods in which the methods are separate from those methods which evaluate large sample distributions. It is well known in the art that large sample methods often fail when applied to small sample data sets.

The term "randomness" in regard to random noise has different meanings in science and engineering. Random (or randomness) is herein defined in terms of a "random process" as measured by a probability distribution model—namely a stochastic (Poisson) process. In naval engineering applications, waveform distributions in the time domain may be considered purely random if the distributions conform to a noise structure such as WGN (White Gaussian Noise). This determination is made regardless of the underlying generating mechanism that produced the "noise."

Pure randomness may be considered a data distribution for which no mathematical function, relation, or mapping can be constructed that provides an insight into the underlying structure. For example: no prediction model can be generated from the noise/time waveform in order to derive estimates of a target range, course, speed, depth, etc. Also, one must distinguish the term "stochastic" randomness from "deterministic" randomness (chaos) as described in U.S. Pat. No. 5,781,460.

The theoretical and practical considerations relevant to the inventive process are contained in the following publications, which are incorporated herein by reference:

Abramowitz, Milton and Irene Stegun. *Handbook of Mathematical Functions with Formulas, Graphs, and Mathematical Tables*. Washington, D.C. United States Government Printing Office: (1964).

Feller, William. *Introduction to the Theory of Probability and Its Applications*. 2nd ed. Vol. I., NY: John Wiley and Sons (1957).

Ruhkin, A. L. "*Testing Randomness: A Suite of Statistical Procedures.*" Theory of Probability and its Applications, Vol. 45, No. 1, pp. 111-132 (2000).

Preparata, Franco P. and Michael I. Shamos, *Computational Geometry—An Introduction*, Springer Verlag (1985).

Swed, F. S. and C. Eisenhart. "Tables for testing randomness of grouping in a sequence of alternatives." *The Annals of Mathematical Statistics*, 14(1), pp. 66-87 (March 1943).

Wald, A. and J. Wolfowitz. "On a test whether two samples are from the same population." *The Annals of Mathematical Statistics*, Vol. 11, pp 147-162 (1940)

Wilks, S. S. "Order statistics." *Bulletin of the American Mathematical Society*. Volume 54, Number 1, Part 1, pp. 6-50 (1948).

The standard approach for assessing the hypothesis of spatial randomness for large samples is outlined in the known work on probability theory by W. Feller (Ch. 6, "The Binomial and Poisson Distributions") [Feller, William. *Introduction to the Theory of Probability and Its Applications*. 2nd ed. Vol. I., NY: John Wiley and Sons. 1957].

Typically, from a frequency table derived from counts of spatial data in a partitioned subspace, a Chi-square test for homogeneity of Poisson frequency levels is computed and compared to a level of statistical certainty. The Feller reference (pp. 149-154), demonstrates the utility of this procedure for several large samples of naturalistic data analyzed in finite rectangular and circular space. The noted data sets include radioactive decay measurements, micro-organism distribution on a Petri dish, and others. However, the Feller reference provides little guidance on the matter of subspace partitioning including how many partitions should be used and what should be done about non-whole subset partitions.

Furthermore, most prior art randomness assessment methods are one time tests designed for one-dimensional or two-dimensional space. The methods are primarily applicable for truly random distributions. However, these quantitative techniques sometimes even fail to correctly label truly nonrandom distributions—as pointed out by Ruhkin (A. L. Ruhkin, "Testing Randomness: A Suite of Statistical Procedures", *Theory of Probability and its Applications*, 2000, Vol. 45, No. 1, pp. 111-132).

The following United States patents significantly improve the above-noted situation.

U.S. Pat. No. 7,277,573 provides a multi-stage method for automatically characterizing data sets containing data points in which are each defined by measurements of three variables as either random or non-random. A three-dimensional Cartesian volume is sized to contain a total number N of data points in the data set which is to be characterized. The Cartesian volume is partitioned into equal-sized cubes, wherein each cube may or may not contain a data point. A predetermined route is defined that goes through every cube one time and scores each cube as a one or a zero; thereby, producing a stream of ones and zeros. The number of runs is counted and utilized to provide a Runs test which predicts if the N data points in any data set are random or non-random. Additional tests are used in conjunction with the Runs test to increase the accuracy of characterization of each data set as random or non-random.

U.S. Pat. No. 7,409,323 provides a method for automatically characterizing data sets containing data points, which may be produced by measurements such as with sonar arrays, as either random or non-random. The data points for each data set are located within a Cartesian space and a polygon envelope is constructed which contains the data points. The polygon is divided into grid cells by constructing a grid over the polygon. A prediction is then made as to how many grid cells would be occupied if the data were merely a random process. The prediction becomes one of two forms depending on the sample size. For small sample sizes, an exact Poisson probability method is utilized. For large sample sizes, an approximation to the exact Poisson probability is utilized. A third test is utilized to test whether the Poisson based model is adequate to assess the data set as either random or non-random.

As evidenced and in summary, the prior art does not disclose a method to provide a faster solution with greater reliability and for widely varying sizes of three-dimensional data sets. The solutions to the above-described and/or related problems have been long sought without success. Consequently, those skilled in the art will appreciate the present invention that addresses the above-described and other related problems.

SUMMARY OF THE INVENTION

It is therefore a general purpose and primary object of the present invention to provide an improved method for characterizing data sets of physical phenomena such as sonar array signals, medical imaging data, and the like, as random noise or as containing a signal.

It is a further object of the present invention to provide a method for characterizing large data sets as well as sparse data sets.

Accordingly, the present invention provides a method for characterizing a plurality of data sets as being random noise or as containing a signal. The method comprises the steps of reading in data points from a first data set of the plurality of data sets and then creating a three-dimensional hull that encloses the data points. The method further comprises a step of ensuring that the hull has a structure that passes through at least four non-coplanar data points from the first data set.

Additional steps comprise partitioning the three-dimensional hull into a plurality of three-dimensional cells and defining the first data set as being a large sample or a small sample based on a selected parameter.

The method further comprises the steps of utilizing a first plurality of tests for characterizing the first data set as comprising random noise or as a signal when the first data set is defined as a large sample and utilizing a second plurality of tests for characterizing the first data set when the first data set is characterized as a small sample.

In one possible embodiment, the method may comprise a step of partitioning the total volume V of data points into the plurality of three-dimensional cells by utilizing at least one of terms $$\sqrt[3]{\frac{V}{k}}, \sqrt[3]{\frac{V_p}{N}}, \text{ or } \sqrt[3]{\frac{V}{N}},$$

where $V_p$ is the volume of the convex hull;

N is the number of points; and k is a value based at least partially on N.

The method may also comprise the step of ending the testing after any of the first plurality of tests or if the second plurality of tests indicates that the first data set comprises the signal.

In another possible embodiment, the second plurality of tests comprises determining a significance probability value for the small sample for a two-tailed hypothesis for a quasi-symmetric finite discrete Poisson probability distribution.

The first plurality of tests may comprise at least a Runs test, a correlation test, an R ratio and confidence interval analysis and a normal approximations z-test for a Poisson distribution. These tests are completed on a number of non-empty of the plurality of cells wherein the first plurality of tests are performed in a predefined and sequential order.

The second plurality of tests may comprise at least a Runs test, a correlation test, an R ratio and confidence interval analysis and an exact Poisson distribution hypothesis test wherein the second plurality of tests are performed in a predefined and sequential order.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

The present invention enhances the likelihood that a correct decision is made in multi-dimensional space for samples of varying sizes. The invention also provides a method to determine whether the three-dimensional data structure conforms to a random process (i.e., predominantly random).

In the preferred embodiment, the present invention creates a compact space by forming a convex hull around time-based measurements. Convex hulls as used herein are discussed by Franco P. Preparata and Michael I. Shamos, Computational Geometry—An Introduction, Springer Verlag, 1985; the discussion incorporated herein by reference.

As used herein, the convex hull of a set of points in space is the surface of a minimum area with a convex (outward) curvature that passes through all the points in the set. In three dimensions, the set must contain at least four distinct, non-coplanar points to make a closed surface with a nonzero enclosed volume.

Typically, a convex hull in the volume will occupy about thirty-five to sixty percent less space than the space needed for containing a rectangular solid—such as proposed in U.S. Pat. No. 7,277,573. Generally, the larger the sample size then the smaller that this difference becomes. As such, a major advantage of the present invention is a more compact region; meaning less processing time. This lessoned processing time is especially noticeable for smaller measurement sets.

A sequenced set of randomness assessment tools tests the randomness hypotheses. The testing is conducted in a sequenced multi-stage paradigm with built-in protocols for detecting aberrant data structures. A flexible mix of known parametric, nonparametric and correlational testing procedures is selectable for similar problems in military and commercial environments.

In one embodiment of the invention, a streamlined decision module functions on an "all or nothing" principle. In another embodiment, an operator has the option of ceasing randomness assessment upon one (or more) instance(s) of a non-random testing result. This approach maximizes the likelihood of a correct decision in a shorter period of time and minimizes the chance of an incorrect decision regarding the signal-noise hypothesis. This approach also reduces unnecessary data processing time when searching for a signal classification in the observed noise-dominated data.

Table 1 reflects the structure of the data sets that this invention evaluates in analysis subsystems.

TABLE 1

Typical Data Set of a Time-Series in Three-Dimensional Cartesian Space For N Measurements

| Time (t) | Measurement (y) | Measurement (z) |
|---|---|---|
| $t_0$ | $y_0$ | $z_0$ |
| $t_1$ | $y_1$ | $z_1$ |
| . | . | . |
| $t_{N-1}$ | $y_{N-1}$ | $z_{N-1}$ |

It is noted that Time (t) may be replaced by a non-temporal continuous variable X.

Figure 1:
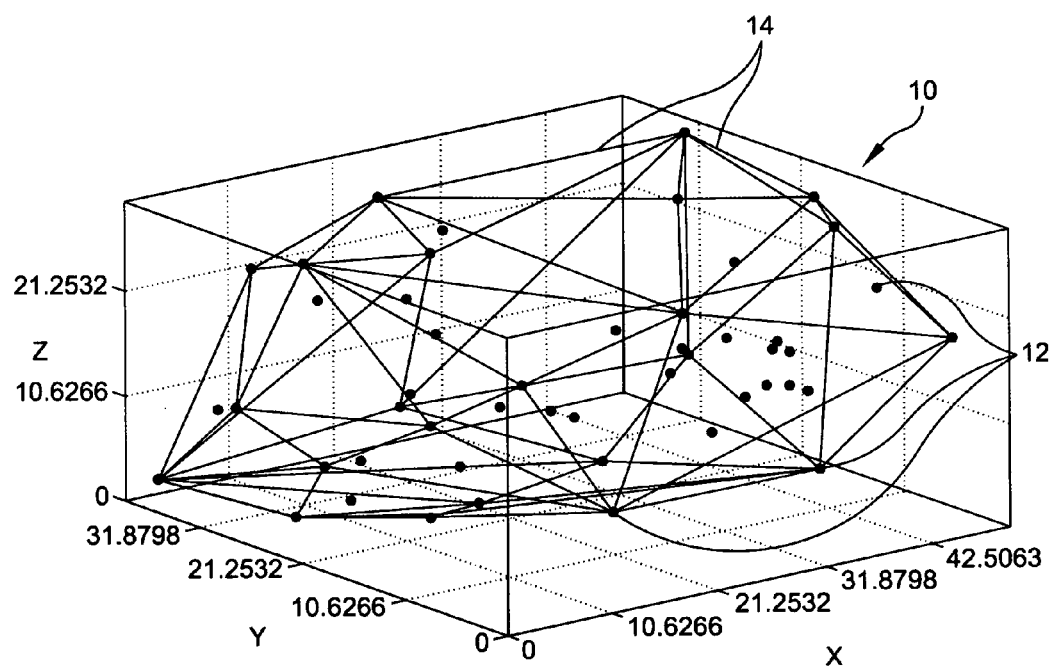
FIG. 1 is a plot of random data points within a convex hull in accordance with the present invention.

These inputted time series (or non-time series) data of unknown structure are first enveloped in a convex hull. The solid polygon shape of the hull is then partitioned into a predetermined number of three-dimensional cubic cells showing a dependent variable x (typically clock time). FIG. 1 depicts a convex hull 10 enclosing a pseudo-random data set of fifty time-data points (x) [shown as labeled item 12] with randomized amplitudes of forty and thirty units (y, z), partitioned into sixty cubic cells. The reduced observation space of approximately fifty percent is notable and is the key to a faster solution. After the waveform is enclosed with a convex hull, then the convex hull is partitioned into three-dimensional partitions (as indicated by partitioning lines 14).

Following this method, a noise-free hull-enclosed helix can be determined to have a signal with a high degree of certainty. Other input waveforms which comprise data points, such as a hull-enclosed elliptic parabaloid, are also found to have a signal with a high degree of certainty.

Exemplary partitioning methods are explained as follows:

Method 1: The first method employs an algorithm that accounts for the length of each axis and identifies how many points are used to determine an ideal number of cubes to partition the total volume V. Taking the cube root of the value found (k), $$\sqrt[3]{\frac{V}{k}},$$

will give the length of the side of each cube. The value k is the optimal number of partitions of cubic subspace as described in U.S. Pat. No. 6,980,926 (O'Brien). Beginning at zero, the axes are partitioned depending on the length of the side.

Method 2: The second method uses the formula $$\sqrt[3]{\frac{V_p}{N}},$$

where $V_p$ is the volume of the hull and N is the number of points used to find the length of each side. Beginning at zero, the axes are partitioned according to this value.

Method 3: The third method uses the formula $$\sqrt[3]{\frac{V_p}{N}}.$$

Beginning at zero, the axes are partitioned according to this value. See FIG. 1 for this partitioning model.

Method 4: The fourth and final method uses the same formulae but also eliminates excess space around the hull. This method identifies that at least one point on the face of the convex hull must be tangent to the y-z plane of the containing region x, y, z. Another alternative deletes or minimizes non-whole cubic subspaces. The fourth method is preferred as affording the tightest possible envelope of an input waveform.

Large Sample Testing Procedures

Method A (Wald-Wolfowitz Independent Sample Runs Test Procedure)

An initial statistical test on input distributions is performed to evaluate the time-series structure of individual data sets. The Runs test is a non-parametric combinatorial test that assesses a randomness hypothesis for a two-valued data sequence and is well known to those skilled in the art [Wald, A. and J. Wolfowitz. "On a test whether two samples are from the same population." *Ann. Math. Stat.*, Vol. 11, pp 147-162, (1940)].

The Runs test has been previously applied in the art to spatial distributions. The test is attractive because it can be applied for spatial randomness in small or large samples with exact probabilities when assumptions of parametric testing procedures are not met. The novel utility in three dimensions was initially demonstrated for a rectangular and solid envelope in U.S. Pat. No. 7,277,573 (O'Brien).

In the Runs test, the procedural steps for a convex hull that are partitioned into cubic subspaces are as follows:

Step 1. Assign a value of "0" or "1" to respectfully indicate a cell as empty or non-empty. The assignment should be identified separately from the number of points in a cell or cell size. Subsequently, count the number of runs in the observation space of the volume in the same manner specified in U.S. Pat. No. 7,277,573 for a three-dimensional data set. A run (also known as a "clump") is a countable sequence of at least one consecutive and identical outcome. For the present invention, a run is a sequential and homogeneous stream of assigned 0 or 1 data followed by a different sequential and homogeneous stream of 0 or 1 data.

Arbitrarily label the total number of 1 data identifiers by $n_1$ and the total number of 0 data identifiers by $n_2$. For example and for the following data exhibit: $n_1$=eight 1 data identifiers and $n_2$=thirteen 0 data identifiers. The total sample size is n=$n_1$+$n_2$, and six runs:

$$\underbrace{\underset{1}{000}\ \underset{2}{11}\ \underset{3}{00000}\ \underset{4}{1111}\ \underset{5}{00000}\ \underset{6}{11}}$$

r = six total runs

Here, the sample shows r=six runs (out of greater than 200,000 combinations) which may be tested for randomness. A sample of ordered binary data (1/0), corresponding to the behavior of the amplitudes of the time-series may show too few or too many runs to be attributable to mere chance variation. This sample indicates deterministic signal information which may be extracted in detecting or tracking objects in an ocean environment. Alternatively, the number of runs may be in accordance with the laws of probability; thereby, indicating a mere chance fluctuation in the behavior of the time series distribution. This fluctuation is indicative of random noise.

Step 2. In a distribution that is truly random, an expected or average number of total runs E(r) is given by the derived relationship:

$$E(r) = \frac{2n_1 n_2}{n_1 + n_2} + 1 \tag{1}$$

Step 3. The variance or spread in the number of runs of a random sample is computed as:

$$\sigma_r^2 = \frac{2n_1 n_2 (2n_1 n_2 - n_1 - n_2)}{(n_1 + n_2)^2 (n_1 + n_2 - 1)} \tag{2}$$

Step 4a. For large samples, to statistically assess the relationship of the total sample number of runs r in dimensional space to the distributional moments, E(r), $\sigma_r^2$; the sample statistic r is submitted to a Gaussian normally distributed test statistic z (with a mean 0 and a variance 1):

$$z = \frac{r - E(r)}{\sqrt{\sigma_r^2}} (n_1, n_2 > 10) \tag{3}$$

Step 4b. Compute the significance probability p of the observed result from the continuous standard Gaussian (normal) distribution:

$$\begin{aligned} p &= Pr(Z \le -z) + Pr(Z \ge z) \\ &= 1 - [Pr(Z \le z) - Pr(Z \le -z)] \\ &= 1 - \frac{1}{\sqrt{2\pi}} \int_{-|z|}^{+|z|} \exp(-.5x^2) dx, \\ &-\infty < |z| < +\infty, 0 \le p \le 1 \end{aligned} \tag{4}$$

where |●| means an absolute value and Pr is probability. In one embodiment, a continuity correction factor of −0.5 may be added to the absolute value of the numerator for small samples where $n_1, n_2 \le 10$.

The p value is the probability of detecting noise. Another interpretation is that p represents the impression that the null hypothesis of random noise is true. Small values of p lead to rejection of the null hypothesis of noise.

For example, in the case of pure noise, z=0 in Equation (3) and p=1 by Equation (4). In the case of a pure signal, $\pm|z| \to \pm\infty$ and p=0 by Equation (4). The calculation of p, well known to those skilled in the art, is performed in a standard finite series expansion.

An estimate of the p value is provided for both the large and small sample testing procedures. This approach streamlines the evaluation process to a simple comparison of p against the a priori false alarm rate "α".

Step 4c. If the sample is small ($n_1, n_2 \le 10$), save the $n_1$, $n_2$ and r values in memory and proceed to Step 5.

Step 5. Calculate the p value, either for the z statistic by Equation (4) or for small samples. The cumulative probability for computed sample runs r is determined by computing the probability of obtaining a quantity Pr(r≤r')—the likelihood of obtaining that many runs or less in a random sample.

To obtain the two-sided equivalent for non-directional hypotheses, the above probability is doubled to obtain the composite significance probability, p=Pr(r≤r')+Pr(r≥r'). The probability of runs, conditional upon r being an even or odd number, is provided by the following combinatorial ratios [see Wilks, S. S. "Order statistics" *Bulletin of the American Mathematical Society*. Volume 54, Number 1, Part 1, pp. 6-50, (1948)].

For the case of r EVEN point probability $$Pr(r = 2k) = 2 \frac{\binom{n_1 - 1}{k - 1}\binom{n_2 - 1}{k - 1}}{\binom{n_1 + n_2}{n_1}}, k = 1, 2, \ldots, n_1, \tag{5}$$

where k is found from r=2k and $$\binom{a}{b} = \frac{a!}{b!(a-b)!}$$

is the binomial coefficient in combinatorial notation.

For the case of r ODD point probability $$Pr(r = 2k - 1) = \frac{\binom{n_1 - 1}{k}\binom{n_2 - 1}{k - 1} + \binom{n_1 - 1}{k - 1}\binom{n_2 - 1}{k}}{\binom{n_1 + n_2}{n_1}}, \tag{6}$$

$$k = 2, 3, \ldots, n_2 - 1,$$

where k is found from r=2k−1, and $$\binom{a}{b}$$

is as above.

The total cumulative probability for a two-sided alternative is p=Pr(r≤r')+Pr(r≥r') and is derived by summing the point probabilities above. The cumulative probability value p is obtained in accordance with the process specified in Swed and Eisenhart F. S. Swed and C. Eisenhart. "Tables for testing randomness of grouping in a sequence of alternatives." *The Annals of Mathematical Statistics*, 14(1):66-87, (March 1943).

For cumulative probability, r EVEN or ODD:

$$Pr(r \le r') = \begin{cases} \frac{2}{\binom{n}{n_1}} \sum_{k=1}^{\frac{r}{2}} \left[\binom{n_1 - 1}{k - 1}\binom{n_2 - 1}{k - 1}\right], \\ \quad n_1 + n_2 = n; r = 2k \ (r \text{ EVEN}) \\ \\ \frac{1}{\binom{n}{n_1}} \sum_{k=2}^{\frac{r+1}{2}} \left[\binom{n_1 - 1}{k - 1}\binom{n_2 - 1}{k - 2} + \binom{n_1 - 1}{k - 2}\binom{n_2 - 1}{k - 1}\right], \\ \quad n_1 + n_2 = n; r = 2k - 1 \ (r \text{ ODD}) \end{cases} \tag{7}$$

The above cumulative probability values must be doubled to assess the non-directional hypothesis specified below. The cumulative probability value p is the most important datum to employ in the decision rule for this subsystem testing.

The standard statistical practice will be used throughout the present method. The rule specifies:

p≥α ⇒ Noise p<α ⇒ Signal+Noise where α is the false alarm rate which is typically set at the five percent level or lower and p is the significance probability of the observed calculation. The Probability of False Alarm (PFA) is defined as, α=Pr(eject $H_0|H_0$=True) or the probability that the null hypothesis (NOISE) is rejected when it is true.

In the decision truth table of signal detection theory, this is considered to be the most serious error for this noise processor system. That is, when the call is SIGNAL but NOISE is dominant, then this is a serious error. This results in unnecessary processing time and is an error which must be minimized.

The value of α represents the percentage of time that a wrong decision will be made (for example: the error of rejecting a null hypothesis when actually true). Obviously, minimizing this type of significant error is a substantive factor in the present method. Correlatively, minimizing α also maximizes 1−α, defined as Pr(Accept $H_0|H_0$=True), which amounts to calling noise correctly. "True" indicates that the distribution is truly random. If α=five percent, this confidence probability 1−α is approximately ninety-five percent.

For a hypothesis text, the non-directional or two-tailed binary hypothesis set is:

$H_0$: r=E(r)(NOISE ONLY)

$H_1$: r≠E(r) (SIGNAL+NOISE)

The distribution is labeled NOISE if p≥α, where α is the false alarm rate. Otherwise, the presence of a signal is most likely indicated by this system subtest.

For the interpretation of a significant outcome (SIGNAL+NOISE); if r is significantly lower than the expected value E(r), this implies a grouping or clustering of measurements (for example: a periodic function produced by rotating or reciprocating machinery). Other possible forms include parabolic and helical surface functions.

If r is significantly higher than the expected value E(r); this implies a repeated and alternating pattern in the measurements. It should be noted that the null hypothesis of "noise only" is analogous to the hypothesis of "NO TARGET" in signal detection theory and the opposite is analogous to "TARGET".

As an example of the calculations for this important module of the subsystem assessment protocol; assume $n_1$=8; $n_2$=21 (n=29) and r=6 (there are over four million possible runs combinations for this sample). The data may be analyzed by the two-tailed probability method and by the approximate Gaussian distribution method.

Since the number of runs is even, the probability of this many runs or less from Equation (7) is:

$$Pr(r \le 6) = \frac{2}{\binom{n}{n_1}} \sum_{k=1}^{\frac{r}{2}} \left[ \binom{n_1-1}{k-1}\binom{n_2-1}{k-1} \right] = \quad (8)$$

$$\frac{2}{\binom{29}{8}} \sum_{k=1}^{3} \left[ \binom{7}{k-1}\binom{20}{k-1} \right] = .0019$$

and the doubled two-tailed probability is p=0.0038.

The small sample normal approximation method with continuity correction factor is provided from Equation (3):

$$z = \frac{|r - E(r)| - \frac{1}{2}}{\sqrt{\sigma_r^2}} = 2.91 \quad (9)$$

and the p value from Equation (4) is:

$$p = Pr(Z \le 2.91) = 1 - \frac{1}{\sqrt{2\pi}} \int_{-|2.91|}^{+|2.91|} \exp(-.5x^2)\,dx = .0036 \quad (10)$$

Each method gives almost identical results at a high degree of precision. If the false alarm rate is 0.05 or 0.01, then p<α ⇒ Signal+Noise. Also, since r<E(r), the data indicates that mechanism-producing periodic motion is suspected.

It is noted that the Runs test has shown high power (call signal correctly) to detect input signal time waveforms. In one experiment, the Runs test quickly detected a signal for a fifty point hull-enclosed elliptic paraboloid with the detection having a high degree of probability.

The significance probability was p=0.000050834 by Equations (3) and (4), which represents the likelihood that this waveform is actually random noise. Since the number of runs was observed to be far less than expected; this indicated a strong structural grouping or clustering of measurements (for example: a periodic/parabolic or a helical surface function).

Method B (R Ratio)

A prior art measure useful in the interpretation of outcomes is the R ratio. The R ratio is defined as the observed-to-theoretical expected occupancy rates in partitioned space:

$$R = \frac{m}{k * \vartheta} \quad (11)$$

where "m"=the observed number of cells occupied (non-empty) in partitioned space; "k"=the number of spatial partitions, and $\vartheta = 1-e^{-\lambda t}$, a Poisson measure specifying the probability that a partition is non-empty in a sample and the proportion of cells expected to be non-empty in a random distribution. k*$\vartheta$ is the Poisson mean number of non-empty partitions.

The range of sample values for R indicate: R<1 (clustered distribution); R≈1 (random distribution); and R>1 (uniform distribution). The minimum R is $R_{min}$=1/k$\vartheta$ and the maximum R is $R_{max}$=N/k$\vartheta$, where N is sample size.

The R ratio is graphed as a linear function in a sample for 1≤m≤N. This measure is used in conjunction with prior art methods in deciding whether to accept or to reject a randomness hypothesis.

An R ratio between 0.90-1.10 is indicative of noise. Outside of that range; a signal waveform should be suspected. For highly skewed distributions (k being much larger than N); a signal structure is suspected when R≥$R_{max}$.

The R ratio is a heuristic measure only in that no probability bands of confidence are associated with the computed value. The interpretation of gathered results should merely confirm or deny a random process when read in conjunction with the results derived from previously developed probability and statistical analyses. Latter-described Method D provides a statistical assessment of the R ratio and a method to determine a ninety percent, ninety-five percent or ninety-nine percent confidence band for R. This capability significantly expands prior art methods.

Along with the correlation module measures in Method C, the R ratio test is a second measure for detecting readings. In operational use, the calculation of the R ratio should be embedded in the testing procedure for Method D.

Method C (Correlation Module)

The use of a multiple linear correlation R for 1 criterion—or dependent variable (usually time t and c predictors or independent variables which are measurements coincident with time) of sample size N is one measure employed to correct the paradox mentioned above in respect to randomness assessment test readings that provide false results for deterministic multivariate functions. The range is $0 \geq R_{t \bullet y,z} \leq 1$ where values near 0 indicates randomness. This statistical measure will help detect threats to the integrity of the method for a class of linear functions. The likelihood that a correct decision is made will be enhanced and lessens the likelihood that an incorrect decision will be made in regard to "signal" vs. "noise".

The squared multiple correlation index for predictors (Y and Z) is derived from the ordinary least squares minimization technique and can be expressed as a weighted sum:

$$R^2_{t \cdot y, z} = \frac{\beta_y r_{ty} \sigma_y + \beta_z r_{tz} \sigma_z}{\sigma_t^2} \quad (12)$$

$$= \frac{r_{ty}^2 + r_{tz}^2 - 2 r_{ty} r_{tz} r_{yz}}{1 - r_{yz}^2}$$

$$0 \leq R^2_{t \cdot y, z} \leq 1; \; -1 \leq [r_{ty}, r_{tz}, r_{yz}] \leq +1,$$

where $\beta_y$ and $\beta_z$ are the beta weights, $r_{ty}$, $r_{tz}$ and $r_{yz}$ are the linear correlations between/among time. The measurements, $\sigma_y$ and $\sigma_z$ are the standard deviations and $\sigma^2 t$ is the time variance.

The driving factors in Equation (12) are the zero-order intercorrelations ($r_{ty}$, $r_{tz}$ and) of the amplitude measures with time. If the amplitude measures are random, no systematic relationship should exist in the time domain. This leads to an overall composite multiple correlation approaching zero which is a situation that is indicative of noise.

This correlation function is known to those skilled in the art. The multiple R is tested for a difference from 0 (randomness) by the statistical F (variance-ratio) distribution (with c and N-c-1 degrees of freedom) using the following distributional relation:

$$\frac{R^2_{t \cdot y,z}}{1 - R^2_{t \cdot y,z}} \frac{N - c - 1}{c} \sim F(c, N - c - 1) \quad (13)$$

If $R_{t \bullet y,z}$ is approximately zero, it can be concluded that the data conforms to a random distribution. The hypothesis set is typically two-tailed.

In the present invention, c is representative of two independent variables (Y, Z). The significance probability p is obtained by direct evaluation of the distribution density F. That is, $$p = 1 - Pr(F_{v_1, v_2} \leq f_{v_1, v_2}) = \quad (14)$$

$$1 - \frac{\Gamma\left(\frac{v_1 + v_2}{2}\right)}{\Gamma\left(\frac{v_1}{2}\right)\Gamma\left(\frac{v_2}{2}\right)} \left(\frac{v_1}{v_2}\right)^{\frac{v_1}{2}} \int_0^F y^{\frac{v_1}{2} - 1} \left(1 + \frac{v_1}{v_2} y\right)^{-\frac{v_1 + v_2}{2}} dy =$$

$$\frac{1}{\left(1 + \frac{v_1}{v_2} F\right)^{\frac{v_2}{v_1}}} = (1 - R^2_{t \cdot y, z})^{\frac{v_2}{2}}$$

$$0 \leq F < \infty, \; 0 \leq p \leq 1,$$

Where $v_1 = C$, $v_2 = N - 3$, $$F = \frac{R^2_{t \cdot y, z}}{1 - R^2_{t \cdot y, z}} \frac{v_2}{v_1}$$

and $\Gamma(\bullet)$ is the complete gamma function.

The value p is interpreted by comparison to the false alarm rate (for example: $p \geq \alpha \Rightarrow$ Noise; otherwise, $p < \alpha \Rightarrow$ Signal+ Noise).

For example, in one typical pseudo-random data set analyzed with fifty measurements, $R_{t \bullet y,z} = 0.0424$, $p \approx 0.96$ (NOISE) by Equation (14).

In order to recognize the minimum value that the multiple correlation can achieve for the noise hypothesis to be rejected, R is solved $$R_{t \cdot y, z} \geq \sqrt{1 - p^{\frac{2}{v_2}}} \quad (15)$$

where p functions as the a priori false alarm rate $\alpha$. For example: if N=50 or $v_2$=47 and p is set to 0.05; then a R≥0.346 correlation is needed to suspect a non-noise distribution with a Probability of False Alarm (PFA) being five percent. Any value less than 0.346 suggests the data to be random with this false alarm rate. Using a one percent PFA, then R≥0.422 is needed to suspect a non-random waveform. The minimum R value in Equation (15) is inversely-related to a sample size for a fixed p value.

In addition to the linear multiple correlation, the present method specifies computing a discrete normalized Autocorrelation Function (ACF) indices for one, two and three time-lags or alternatively more (depending on sample size N) if the multiple linear R shows noise.

Autocorrelation is the cross-correlation of a signal with itself. The measure is designed to detect repeating patterns in nonlinear time-series distributions (e.g., periodic, quasi-periodic, parabolic, etc.).

Whereas, the linear measure $R_{t \bullet y, z}$ will detect a linear trend relationship in time; the linear measure will not necessarily detect nonlinear relationships among the amplitude measurements. The autocorrelation function will better detect such nonlinear trends which other testing procedures may mislabel as noise.

As provided below, the method computes autocorrelations for two models (first with $Y_t$ as a dependent variable and then with $Z_t$ as a dependent variable). Table 2 illustrates the structure for an autocorrelation analysis of 1, 2, 3-lags, with a $Y_t$ dependent variable.

TABLE 2

Model Illustrating Three-lag Autocorrelations
(Amplitude $Y_t$ as a dependent variable)

| (1) T Time | (2) $Y_t$ depend | (3) $Z_t$ indep | (4) $Z_{t+1}$ indep Lag-1 | (5) $Z_{t+2}$ indep Lag-2 | (6) $Z_{t+3}$ indep Lag-3 |
|---|---|---|---|---|---|
| $t_0$ | $y_0$ | $z_0$ | $z_1$ | $z_2$ | $z_3$ |
| $t_1$ | $y_1$ | $z_1$ | $z_2$ | $z_3$ | $z_4$ |
| . | . | . | . | . | . |
| $t_{N-4}$ | $y_{N-4}$ | $z_{N-4}$ | $z_{N-3}$ | $z_{N-2}$ | $z_{N-1}$ |
| $t_{N-3}$ | $y_{N-3}$ | $z_{N-3}$ | $z_{N-2}$ | $z_{N-1}$ | |
| $t_{N-2}$ | $y_{N-2}$ | $z_{N-2}$ | $z_{N-1}$ | | |
| $t_{N-1}$ | $y_{N-1}$ | $z_{N-1}$ | | | |

This procedure amounts to computing successive multiple linear correlation indices ($0 \le R \le 1$) between the dependent variable $Y_t$ and the time lags of $Z_{t+1}$, $Z_{t+2}$ and $Z_{t+3}$, and other lags, analogous to the structure in Equation (12). That is the autocorrelation of lag-1 $R_{y_t \bullet z_t z_{t+1}}$ (column 2 with column 3 and 4); the autocorrelation of lag-2 $R_{y_t \bullet z_t z_{t+2}}$ (column 2 with column 3 and 5); and the autocorrelation of lag-3 $R_{y_t \bullet z_t z_{t+3}}$ (column 2 with column 3 and 6). Additional lags are computed in a similar fashion.

If the data are random, the simple k-lag zero-order intercorrelations of the dependent variable $Y_t$ with the amplitude measures, $r_{y_t \bullet z_{t+k}}$, will be zero driving the R value towards 0 in the multiple autocorrelation formula for all lag lengths.

The second modeling approach requires treating $Z_t$ as the dependent variable as shown in Table 3 for an exemplary three-lag analysis.

TABLE 3

Model Illustrating Three-lag Autocorrelations
(Amplitude $Z_t$ as a dependent variable)

| (1) t Time | (2) Zt depend | (3) Yt indep | (4) $Y_{t+1}$ indep Lag-1 | (5) $Y_{t+2}$ indep Lag-2 | (6) $Y_{t+3}$ indep Lag-3 |
|---|---|---|---|---|---|
| $t_0$ | $z_0$ | $y_0$ | $y_1$ | $y_2$ | $y_3$ |
| $t_1$ | $z_1$ | $y_1$ | $y_2$ | $y_3$ | $y_4$ |
| . | . | . | . | . | . |
| $t_{N-4}$ | $z_{N-4}$ | $y_{N-4}$ | $y_{N-3}$ | $y_{N-2}$ | $y_{N-1}$ |
| $t_{N-3}$ | $z_{N-3}$ | $y_{N-3}$ | $y_{N-2}$ | $y_{N-1}$ | |
| $t_{N-2}$ | $z_{N-2}$ | $y_{N-2}$ | $y_{N-1}$ | | |
| $t_{N-1}$ | $z_{N-1}$ | $y_{N-1}$ | | | |

The reverse correlation procedure amounts to computing the multiple linear correlation index between the dependent variable $Z_t$ and the time lags of $Y_{t+1}$, $Y_{t+2}$ and $Y_t+3$, analogous to the structure in Equation (12). That is for three lags: the autocorrelation of lag-1 $R_{z_t \bullet y_t y_{t+1}}$ (column 2 with column 3 and 4); the autocorrelation of lag-2 $R_{z_t \bullet y_t y_{t+2}}$ (column 2 with column 3 and 5); and the autocorrelation of lag-3 $R_{z_t \bullet y_t y_{t+3}}$ (column 2 with column 3 and 6). Additional lags are computed in a similar fashion. As noted above, randomness occurs when the dependent variable $Z_t$ does not correlate with the simple lag correlations, (For example: $r_{z_t \bullet y_{t+k}} \approx 0$).

The reason for this more complicated approach for three-dimensional autocorrelation analysis is two-fold. First, in a closed system of data inputs, one cannot specify the dependent variable a priori in a meaningful manner or one cannot know the exact nonlinear mathematical structure of the waveform to be detected (periodic, parabolic, etc.). Second, the linear R and the k-lag autocorrelations will show $R_{t \bullet y_t z} \approx R_{y_t \bullet z_t z_{t+k}} \approx R_{z_t \bullet y_t y_{t+k}} \approx 0$ for random noise. However for signal waveforms, it is not necessarily true that for a k-lag autocorrelation, $R_{y_t \bullet z_t z_{t+k}} = 0$ and $R_{z_t \bullet y_t y_{t+k}} = 0$. At least one model is expected to detect signal structure for nonlinear forms.

This approach will enhance the likelihood that a signal waveform will be detected and not inaccurately be labeled as noise when used in conjunction with the Runs test and other analysis procedures of the present method.

When a three-dimensional data set is not a time series; correlational analysis can be complicated in real-time experiments in which a rapid yes-no classification is required. An example of this circumstance is when a causal model is not present to specify the dependent and independent variables in order to detect and classify the three-dimensional functional form.

Many variable relational techniques are known to those skilled in the art, including multivariate nonlinear curve fitting, partial correlation, canonical correlation analysis, pattern recognition, image processing, feature extraction, and other multivariate data reduction techniques. These are large sample methods requiring significant analyst input to determine the interpretation of outcomes. The present method focuses on time series analyses with potentially sparse data sets in real-time operating systems in which a rapid classification of noise/signal is required for unknown waveforms.

The hypothesis of no relationship ($R \approx 0$) in time series data will be resolved by comparing the observed autocorrelation R values for N discrete sample points against the approximate standard error on a correlogram (For example: accept the noise hypothesis if the autocorrelation measure lies between the critical values of the white noise band, $$0 \le R \le \frac{1.96}{\sqrt{N}},$$

for a five percent false alarm rate). If R falls outside the ninety-five percent band; a signal structure is suspected. Approximately five percent of autocorrelations fall outside the band.

The random wave form in FIG. 1 depicts the following autocorrelation co-efficients: Lag 1: $R_y$, ... $z_t$, $z_{t+1}$=0.152; Lag 2: $R_y \cdot Z_t$, $Z_{t+2}$=0.154; Lag 3: $R_y \cdot Z_t$, $Z_{t+3}$=0.113. All indicate white noise, since the minimum intensity for deciding "signal" is 0.277 with fifty measurements at a five percent false alarm rate.

As a rationale for this two-step correlational procedure; assume a noise-free parabolic function in two-space $f(t)=y=9-t^2$, plotted for $t \pm 3$ (seven data points). The linear relationship between t and y, $r_{t,y}$, is zero which indicates noise.

Thus far, the method indicates a random distribution for a simple deterministic function. However, the autocorrelations show an increasing intensity in relationship (For example: $r_{y_t y_{t+1}}=+0.36$; $r_{y_t y_{t+2}}=-0.48$; $r$ $r_{y_t y_{t+3}}=-0.84$; the fourth lag shows r $r_{y_t y_{t+4}}=-0.96$, and the fifth lag shows r $r_{y_t y_{t+5}}=-1.00$). The parabolic signal structure is revealed by the successive serial correlations. With each lag, the plot of $y_t$ with $y_{t+k}$ becomes more linear (inversely).

In this case, the first three lags are likely sufficient to indicate a signal structure. Such a change cannot be observed with random noise regardless of sample size or the number of time lags since the correlations will fall within the boundaries of the critical white noise band.

By contrast, in the case of a simple circle function in two-space, $x^2+y^2=9$, $-3 \leq x \leq +3$ (twelve data points), the method of the Runs procedure quickly detects a signal waveform at a high level of certainty. The autocorrelations increase in intensity only by the fourth and fifth lag. These examples demonstrate that such experiments require a flexible mix of testing procedures in order to arrive at a correct time waveform classification.

The autocorrelation analysis (with $Y_t$ and $Z_t$ as separate dependent variables) detects signals in similar three-dimensional algebraic/geometric and periodic functional forms which might otherwise be mislabeled as noise.

Method D (Normal Approximation z-Test for Poisson Distribution Based on the Number of Non-Empty Partitions)

This testing procedure, derived from the Central Limit Theorem, is used for evaluating the following binary non-directional hypothesis set regarding the number of cells that are non-empty in a partitioned volume as compared to the expected number or mean in a random distribution:

$H_0$: $k\Theta=m$ (NOISE)
$H_1$: $k\Theta \neq m$ (SIGNAL+NOISE)

The normal approximation Poisson z test statistic takes the form $$z = \frac{m - k\vartheta}{\sqrt{k\vartheta}} \sim N(0, 1) \quad (16)$$

where $N(0, 1)$ indicates the z measure is an approximate and normally-distributed random variable with a mean 0 and a variance 1 in samples of more than twenty-five measurements.

As discussed in Method B, the quantity $\Theta$ is the probability that a cell is non-empty in a random distribution population and the quantity $k\Theta$ is the mean or the average number of non-empty partitions in a stochastic random distribution.

Since the population parameter $\Theta$ is rarely known, the sample Poisson measure is used, $\vartheta = 1-\exp(-\lambda t)$, where $\lambda t$ is the average number of points per partition. The quantity, $k\vartheta$, is the sample mean or the average number of partitions expected to be non-empty in a spatial random sample. The sample measure m is the actual number of k partitions which are non-empty. These quantities are defined further by using a Poisson frequency analysis notation (as described in the note for Table 4).

As discussed earlier, the operator would compare the value of z against a probability of false alarm $\alpha$. The significance probability p of the observed value z is calculated with Equation (4):

$$p = Pr(Z \leq |z|) = 1 - \frac{1}{\sqrt{2\pi}} \int_{-|z|}^{+|z|} \exp(-.5x^2)dx, \quad (17)$$

$$-\infty < |z| < +\infty, \; 0 \leq p \leq 1$$

where $|\bullet|$ is an absolute value. The decision protocol below is adopted:

$p \geq \alpha \Rightarrow$ Noise
$p < \alpha \Rightarrow$ Signal+Noise

It is seen that if $m \approx k\vartheta$, or $R \approx 1$, then $z \approx 0$ and $p \approx 1$ (noise).

Based on Equation (16), a ninety-five percent or ninety-nine percent confidence interval (CI) can be constructed for the point estimate m when $H_0$ is true (noise); that is, to determine the range of m which is indicative of noise/signal. A ninety-five percent confidence interval ($CI_{0.95}$) is obtained by solving for m in Equation (16), written as an algebraic probability statement:

$$CI_{0.95}(m) = k\vartheta - 1.96\sqrt{k\vartheta} \leq m \leq k\vartheta + 1.96\sqrt{k\vartheta},$$

or $$CI_{0.95}(m) = k\vartheta \pm 1.96\sqrt{k\vartheta} \quad (18)$$

where $\pm 1.96$ is the critical value of the Gaussian distribution when the false alarm rate is five percent for a two-tailed hypothesis.

Equation (18) represents the range that m can vary when a distribution is random with a ninety-five percent certainty. A ninety-nine percent CI is derived in a similar manner; the $\pm 1.96$ is changed to $\pm 2.576$; for ninety percent use $\pm 1.645$.

The lower limit can be $k\vartheta - 1.96\sqrt{k\vartheta}$ on m or $m_L$ and $k\vartheta + 1.96\sqrt{k\vartheta}$ as the upper limit $m_U$. This allows a useful measure in terms of the intuitive R ratio, $m/k\vartheta$.

For example, if $N=k=25$, then $k\vartheta = 25[1-\exp(-1)] = 15.8$ cells non-empty on the average in a random distribution. A ninety-five percent CI for m is $CI_{0.95}(m) = k\vartheta \pm 1.96\sqrt{k\vartheta} = (8, 24)$, rounded. Translated into the R ratio in terms of $m_L$ and $m_U$, $$R_{noise} = \left(\frac{m_L}{k\vartheta}, \frac{m_U}{k\vartheta}\right) = \quad (19A)$$

$$\left(\frac{k\vartheta - 1.96\sqrt{k\vartheta}}{k\vartheta}, \frac{k\vartheta + 1.96\sqrt{k\vartheta}}{k\vartheta}\right) \approx 1 \pm .49 \approx (0.51, 1.49),$$

or in general, $$R_{noise} = 1 \pm \frac{1.96}{\sqrt{k\vartheta}}$$

(ninety-five percent confidence) which represents the lower and upper boundary on the R ratio of a random distribution. Replace 1.96 with 1.645 or 2.576 respectively for ninety percent and ninety-nine percent confidence.

If $N \leq k \leq 10^3$, $R_{noise} = 1 \pm 0.07$ which shows that the range narrows as the sample size increases until, in the limit as $N \to \infty$, $R_{noise} \to 1.0$ (pure noise).

One further measure that may be of use: if $N \approx k$, a quick result is:

$$R_{noise} \approx 1 \pm \frac{2.1}{\sqrt{k}}$$

(ninety percent confidence); or $$R_{noise} \approx 1 \pm \frac{2.5}{\sqrt{k}}$$

(ninety-five percent confidence); or $$R_{noise} \approx 1 \pm \frac{3.2}{\sqrt{k}}$$

(ninety-nine percent confidence).

Note that for highly skewed distributions (k being much larger than N), the value of the maximum R should be obtained (U.S. Pat. No. 7,409,323 demonstrates this methodology). A signal structure is suspected when R≥R$_{max}$.

These analyses demonstrate the usefulness of the R ratio, $$R = \frac{m}{k\vartheta},$$

when coupled with a confidence interval analysis. It is a fast randomness assessment technique as well as a means to detect the paradox of deterministic relations being declared random.

As mentioned above, the calculation of the R ratio should be embedded within the testing procedure in Method D. The tests are described separately for narrative purposes only.

Method E (Chi-Square Test of Homogeneity—an Alternative)

The Chi-square test is used to decide if the Poisson distribution is adequate to model a random process.

TABLE 4

POISSON ANALYSIS
Frequency Table Protocol and Definitions

| (1) | (2) | (3) | (4) | (5) |
|---|---|---|---|---|
| k | $n_k$ | k·$n_k$ | P(k; λt) | N·P(k; λt) |
| 0 | $n_0$ | 0 | P(0; λt) | N·P(0; λt) |
| 1 | $n_1$ | $n_1$ | P(1; λt) | N·P(1; λt) |
| . | . | . | . | . |
| K | $n_K$ | K·$n_K$ | P(K; λt) | N·P(K; λt) |
| TOTAL | N | T | 1.00 (approx.) | N (approx.) |

NOTE: $n_0 = N - \Sigma_{k=1}^{k=K} n_k$ (zero bin is calculated last). (19B)

$V_p$ is the computed volume of the convex hull polygon, partitioned into N cubes;

k is an index indicating an empty cell (k=0), cells with one point (k=1), etc.;

K is the number of categories of k;

$n_k$ is the frequency count associated with k (NOTE: $n_k$<5 must be combined with an adjacent cell to ensure $n_k$≥5. The value K is adjusted accordingly);

$$N = \sum_{k=0}^{K} n_k$$

is the number of partitions (cells); wherein N is defined as k in the procedures of Method D;

$$T = \sum_{k=0}^{K} k \cdot n_k$$

is the total number of points in a sample (known a priori). In small samples, T may not equal the input sample size.

$$\lambda t \approx \frac{\sum_{k=0}^{K} k \cdot n_k}{\sum_{k=0}^{K} n_k} \approx \frac{T}{N}$$

is the average occupancy rate or points per cell for the entire distribution. The relationship $$t = \frac{V_p}{N}$$

is the average volume of the cubic subset partitions.

$$P(k; \lambda t) = \exp(-\lambda t) \frac{(\lambda t)^k}{k!},$$

Poisson probability distribution function.

$$\sum_{k=0}^{K} P(k; \lambda t) = Pr(k=0; \lambda t) + Pr(k>0; \lambda t) \approx 1$$

Pr(k>0; λt)=1−exp(λt), probability that a cell is non-empty. The probability Pr(k>0; λt)=1−exp(λt) is re-defined as ϑ in Equation (8), (16) and (20). When this value is multiplied by the total number of partitions N, the result provides the Poisson mean referred to as kϑ which is an important measure for Method B and Method D (large and small sample).

$n_k$≈N·P(k; λt) in a random distribution.

$$\sum_{k=0}^{K} N \cdot P(k; \lambda t) \approx N$$

$$m = \sum_{k=0}^{K} n_k - n_0$$

is the total number of non-empty partitions.

$$R = \frac{m}{N \cdot Pr(k > 0; \lambda t)} \approx 1$$

in a completely random distribution [R Ratio of Equation (8)].

The R ratio is therefore defined in each notation system as:

$$R = \frac{\sum_{k=0}^{K} n_k - n_0}{\sum_{k=0}^{K} n_k Pr(k>0; \lambda t)} = \frac{m}{N\left[1 - \exp\left(-\frac{T}{N}\right)\right]} = \frac{m}{k\vartheta}$$

$k\vartheta$ is the mean or expected number of non-empty partitions. This number is an important measure used in the Module B and Module D testing procedures.

Chi-square statistic for homogeneity test (with K−2 degrees of freedom):

$$\chi^2 = \sum_{k=0}^{K} \frac{(o_k - e_k)^2}{e_k},$$

where $o_k = n_k$; $e_k = N \cdot P(k; \lambda t)$.

The Chi-square test for homogeneity is performed on the observed sample frequencies and expected random noise Poisson theoretical frequencies.

Method F (Non-Linear Correlation—an Alternative)

An alternative correlation function is the eta η (or nonlinear correlation) coefficient in time-series analyses. This measure is known to provide the maximum correlation possible between the time criterion and any function, linear or nonlinear combinations, of the predictors. The correlation ratio is always at least as large as the linear correlation. For example: $\eta^2_{t \bullet y, z} \geq R^2_{t \bullet y, z}$. The range is: $0 \leq \eta_{t \bullet y, z}$. Other alternative correlational measures are indicated in correlation Method C for non-time series data sets.

Example of Analysis Procedures

In one exemplary experiment, a sample of fifty pseudo-random data points was assigned to 125 cells of partitioned subspace within a convex hull of total volume $$V_p = 516\frac{1}{6}$$

contained in a $10^3$ region of measurement amplitude $$\frac{V_p}{V} = .517$$

—forty-nine percent reduction in observation space).

The frequency analysis of at least partially of these fifty points is shown below in accordance with the definitions and properties as previously described with Table 4; Poisson Analysis.

TABLE 5

Poisson Frequency Analysis

| (1) k | (2) $n_k$ | (3) k · $n_k$ | (4) P(k; λt) | (5) N · P(k; λt) |
|---|---|---|---|---|
| 0 | 86 | 0 | .6811 | 85.14 |
| 1 | 30 | 30 | .2616 | 32.69 |
| ≥2 | 9 | 18 | .0502 | 6.28 |
| TOTAL | N = 125 | T = 48 | .9929 | 124.11 |

Overall, the frequency data in Table 5 is reasonably dispersed and indicates that the Poisson model is adequate to model the three-dimensional random data enveloped in a partitioned convex hull. The difference between data in Column (2) compared to the data of Column (5) is the primary comparison. The Chi-square homogeneity value for model fit is 1.41 (ν=K−2=1 degrees of freedom) with a probability of p=0.49 (noise distribution). The p value was obtained by direct evaluation of the integral for the Chi-square density, $f(\chi_\mu^2)$, similar to the approaches used to compute Equations (4) and (14). Thus, the Poisson distribution is adequate to model the data as a random process embedded in a three-dimensional polygon.

Other analyses that can be obtained from Table 5 and the raw data of fifty measurements can show that the number of non-empty cells amounts to m=39 (N−$n_0$). The expected average number in a random distribution is $$125\left[1 - \exp\left(-\frac{48}{125}\right)\right] = 39.86$$

and the R ratio is $$\frac{39}{39.86} = .98,$$

which is very close to pure randomness.

In the alternative, the actual sample size of fifty points may be used to carry out the computations if the alternative Module E is not used as part of the present method.

The confidence analysis procedure indicates that a ninety-five percent noise band for the data is (0.69, 131) for the R ratio which contains the observed R. Likewise, a ninety-five percent CI for m is (27, 52), rounded. With ninety-five percent certainty, the m and R values are expected to fall within these ranges.

Moreover, from this data, the z test procedure of Method D can be applied which shows a p value of 0.89 (noise). Here the value a $k\vartheta$ =39.86. The Runs test returned a p value of 0.84 (noise)

Since partitioning is irrelevant to the correlation measure, the multiple linear correlation was obtained in fifty simulation runs with an average correlation of $R_{t \bullet y, z}$=0.154 [a p value of 0.57 (noise)]. The noise variance accounts for approximately ninety-eight percent of the total variance. Autocorrelations also indicate random noise.

This is an exemplary technical analysis for the data set in accordance with the present method. Each procedure is similar in result in that the data are noise with a high amount of certainty as compared to a false alarm rate of five percent and less.

The above data analysis results are comparable to the results disclosed in the method for a rectangular solid in previously-referenced U.S. Pat. No. 7,277,573. The difference is a forty-nine percent reduction in observation space with the use of convex hull which translates into a solution obtained in approximately half of the time.

Small Sample Testing Procedures (Measurements≤25)

Testing Method A, Method B and Method C are also applicable to a small sample case.

The R ratio of Method B should be viewed as descriptive rather than inferential when applied to small samples. The suggested guideline is 0.90≤R≤1.10⇒ NOISE; otherwise, SIGNAL R≥$R_{max}$⇒ SIGNAL [highly skewed distributions—k being much larger than N].

The correlation of Method C presents a statistical problem for small samples. The ability to reject the null hypothesis (noise) depends on the sample size. A high correlation computed on a small sample size may be insufficient to reject the null hypothesis for purely statistical reasons. For this reason, a heuristic procedure in the interpretation of the linear and autocorrelation measure is stated in the following decision rule:

R≤0.32⇒ NOISE
R>0.32⇒ SIGNAL+NOISE where R refers to either the multiple linear correlation or the autocorrelation measures of any lag length for $Y_t$ and $Z_t$ as dependent variables. A correlation of 0.32 translates into a ten percent signal variance. Other users of the method may choose different cut-off values (twenty percent, twenty-five percent signal variance, etc.) but the recommended level appears useful for application to time series or other in situ distributions. The level can be adopted to the results of operational testing.

Method G (Exact Poisson Distribution Hypothesis Test)

This testing procedure is the small sample analogue of the normal approximation test in Method D. The procedure provides more accurate estimates of probabilities.

Based on the Poisson point process theory for a measurement set of data in a time interval Δt with corresponding measurements of magnitudes ΔY and ΔZ; that data set is considered to be purely random if the number of partitions k is non-empty (containing no observable measurements) to a specified degree. The observed number of non-empty partitions is m, as defined in the Note of Table 4 with follow-on supporting language—to be referred to as Equation (19B) hereinafter for all uses of the Note of Table 4. The mean or expected number of non-empty partitions in a random Poisson distribution is given by:

$$kΘ = k(1 - e^{-\lambda t}) \quad (20)$$

where Θ is the probability that any cell is non-empty in a completely random Poisson distribution and λt is the population parameter of the spatial Poisson process defined in Equation (19B) corresponding to the average number of points observed across all three-dimensional subspace partitions in a random distribution. A spatial Poisson process is assumed to govern the mechanism. The calculation of Equation (20) comes directly from the standard Poisson distribution function given in Equation (19B).

In one embodiment of the present method, the spatial mean λt is calculated from a frequency distribution of Poisson distributed variables in the manner recommended by Feller, Ch. 6. [Feller, William. *Introduction to the Theory of Probability and Its Applications*. Vol I., NY: John Wiley and Sons. (1957)]. This quantity was defined in Equation (19B).

The sample value of λt corresponds to the average "hit rate" or average number of points across all cubic whole and part subspaces of the convex hull in three dimensions and t is the volume of a cubic partition. This situation was defined in Equation (19B).

An alternative to calculate Equation (20) is a standard manner for evaluating a two-tailed hypothesis for finite discrete probability distributions. However, no known way is provided for calculating the significance probability value p for two-tailed hypotheses—as was done for the symmetric infinite Gaussian distribution. If the Poisson mean kϑ >10, the Poisson distribution can be approximated by the Gaussian distribution with the mean and variance of the original Poisson distribution. At this level, the Poisson distribution becomes more symmetric about the mean.

A quantized continuity correction factor of plus or minus 0.5 is applied to the computations since a discrete distribution is approximated by a continuous one. The identifier p can then be calculated fairly accurately. This was the rationale for Equation (16) as derived from the Central Limit Theorem.

For small Poisson means, the distribution is skewed so this Gaussian approximation is not calculable and the p value cannot be provided. This is the situation for which the probability test was designed for the present invention. The need for this probability test (for example: very small samples) will rarely occur.

A derived algorithm of Equation (26) provides an estimate of the significance probability p for evaluating a two-tailed hypothesis for the quasi-symmetric finite discrete Poisson probability distribution. It is validated against the calculated p values for the large sample z test described in Equation (16).

The boundary, above and below the Poisson mean kΘ, attributable to random variation and controlled by a false alarm rate, is the critical region of the test. In practice, there is no knowledge of the population parameter Θ and the functional parameters of that measure. Rather, sample observations ϑ and k are worked with and compared to the frequency structure against a theoretical probability distribution which models random noise.

In essence, this exact probability test determines if the observed number of non-empty cells m is contained within the boundaries of the theoretical Poisson model expectations which is a situation indicative of random noise for the three-dimensional data set. If m falls in the critical region; a signal waveform is suspected.

Lower Boundary Value of Critical Region

The test procedure is described in detail below. An example is provided to clarify each step.

Let $y_1$ be the integer quantity forming the lower boundary of the sample mean kϑ given by the Poisson criterion:

$$Pr(Y \leq y) \leq \frac{\alpha_0}{2}, \min\left(\frac{\alpha}{2} - \frac{\alpha_0}{2}\right)$$

Where $$Pr(Y \leq y) = \sum_{y=0}^{y_1} P(y; kϑ), \quad (21)$$

Pr is probability and P(y; kϑ) is the discrete Poisson probability distribution function given as:

$$P(y; kϑ) = \frac{e^{-kϑ}(kϑ)^y}{y!}, \quad (22)$$

$$\text{where } \sum_{y=0}^{\infty} P(y; kϑ) = 1.0$$

The upper limit on the summation is finite in practice; selected such that the summation achieves a predetermined level of convergence (for example: the sum is approximately 0.99999).

The quantity $\alpha_0$ is the probability nearest to an exact value of the pre-specified false alarm probability $\alpha$ and $y_1$ is the largest value of y such that $$Pr(Y \le y) \le \frac{\alpha_0}{2}.$$

It is an objective to minimize the difference between $\alpha$ and $\alpha_0$. The Probability of False Alarm (PFA) is typically set at five percent.

Upper Boundary Value of Critical Region

The upper boundary of the Poisson probability test is called $y_2$ and is determined in a manner similar to that for determining the lower boundary value $y_1$.

Let $y_2$ be the integer quantity forming the upper random boundary of the mean $k\vartheta$ given by:

$$Pr(Y \ge y) \le \frac{\alpha_0}{2}, \min\left(\frac{\alpha}{2} - \frac{\alpha_0}{2}\right) \qquad (23)$$

where $$Pr(Y \le y) = 1 - \sum_{y=0}^{y_2} P(y; k\vartheta)$$

The value $\alpha_0$ is the probability closest to an exact value of the pre-specified false alarm probability $\alpha$, and $y_2$ is the largest value of y such that $$Pr(Y \ge y) \le \frac{\alpha_0}{2}.$$

It is an objective to minimize the difference between $\alpha$ and $\alpha_0$.

Hence, the subsystem determines if the frequency structure contains a "y" amount of observed points within the critical region; thereby, warranting a determination of random (otherwise, nonrandom is the call) with the associated PFA $\alpha$ being wrong in the decision when random is the analysis test result (See the discussion for Table A).

The overall protection against a Type I error—$\alpha$—is the sum Pr $(Y \le y_1)$ + Pr $(Y \ge y_2)$ which is often higher (as previous research has indicated). This value is also known as the actual level of significance.

Hypothesis

In the hypothesis, the subsystem assesses and evaluates the random process binary hypothesis for small samples by means of the sample proportion of non-empty partitions:

$H_0$: $\Theta = \vartheta$ (NOISE)
$H_1$: $\Theta \ne \vartheta$ (SIGNAL+NOISE)

Decision Rule $y_1 < y < y_2 \Rightarrow$ Noise
$y_2 \le y \le y_1 \Rightarrow$ Signal+Noise, where y=m (the number if non-empty cells are in a sample).

The false alarm rate is set at $\alpha = 0.05$ for very small samples. For (N$\le$16); $\alpha$ a may be set to 0.10.

As mentioned, the quantity $\Theta$ is the unknown population parameter representing the probability that a cell is non-empty in a completely random Poisson distribution and $\vartheta$ is the sample value indicated above $\vartheta = 1 - e^{-\lambda t}$.

Note that the actual Poisson hypothesis test uses the calculated mean $k\vartheta$ (referred to as the Poisson mean $\mu$ or $\lambda$ in probability distribution tables) to carry out the calculations for assessing the hypothesis set. This practice is done for convenience since the probability $\vartheta$ is a small quantity ($0 \le \vartheta < 1$) in finite samples which gives a restricted range of the Poisson probability distribution integer count parameter y in the Poisson probability function P(y; $k\vartheta$).

In practice, one does not possess a priori knowledge of the population parameters; therefore, sample spatial data is compared against a known probability function which characterizes the structure of a random distribution. The Poisson distribution is known to model a random process for distributions on the line interval and in the partitioned plane.

Example of Testing Procedure

Because the principle of the exact Poisson probability test is the same regardless of the sample size, the testing procedure is illustrated for the data previously analyzed (see Table 4). The following summary data ($\vartheta = 0.319$; $k\vartheta = 39.86$; m=39) are required to carry out the computations and to arrive at a reasonable decision for the signal-noise hypothesis.

As previously defined, "m" is the observed number of non-empty partitions; $\vartheta = 0.319$ is the probability that a cell is non-empty, and $k\vartheta$ is the mean or expected number of non-empty partitions in a random distribution.

From this data, the two-tailed hypothesis set is:
$H_0$: $\Theta = 0.319$ (NOISE)
$H_1$: $\Theta \ne 0.319$ (SIGNAL+NOISE)

This input generates the discrete Poisson distribution P(y; $k\vartheta$) given in

TABLE 6

Poisson Probability Distribution for k9 39.86

| y | Prob | Cum % |
|---|------|-------|
| 16 | 0.001% | 0.002% |
| 17 | 0.002% | 0.004% |
| 18 | 0.005% | 0.009% |
| 19 | 0.010% | 0.019% |
| 20 | 0.021% | 0.040% |
| 21 | 0.039% | 0.079% |
| 22 | 0.071% | 0.150% |
| 23 | 0.123% | 0.272% |
| 24 | 0.204% | 0.476% |
| 25 | 0.325% | 0.801% |
| 26 | 0.498% | 1.300% |
| 27 | 0.736% | 2.036% |
| 28 | 1.047% | 3.083% |
| 29 | 1.440% | 4.523% |
| 30 | 1.913% | 6.435% |
| 31 | 2.459% | 8.894% |
| 32 | 3.063% | 11.958% |
| 33 | 3.700% | 15.657% |
| 34 | 4.337% | 19.995% |
| 35 | 4.939% | 24.934% |
| 36 | 5.469% | 30.403% |
| 37 | 5.891% | 36.294% |
| 38 | 6.179% | 42.473% |
| 39 | 6.315% | 48.789% |
| 40 | 6.293% | 55.082% |
| 41 | 6.118% | 61.200% |
| 42 | 5.896% | 67.006% |
| 43 | 5.382% | 72.388% |
| 44 | 4.875% | 77.263% |
| 45 | 4.318% | 81.581% |
| 46 | 3.742% | 85.323% |
| 47 | 3.173% | 88.496% |
| 48 | 2.635% | 91.131% |
| 49 | 2.143% | 93.275% |
| 50 | 1.709% | 94.983% |

TABLE 6-continued

Poisson Probability Distribution for k9 39.86

| y | Prob | Cum % |
|---|------|-------|
| 51 | 1.335% | 96.319% |
| 52 | 1.024% | 97.342% |
| 53 | 0.770% | 98.112% |
| 54 | 0.568% | 98.680% |
| 55 | 0.412% | 99.092% |
| 56 | 0.293% | 99.385% |
| 57 | 0.205% | 99.590% |
| 58 | 0.141% | 99.731% |
| 59 | 0.095% | 99.826% |
| 60 | 0.063% | 99.889% |
| 61 | 0.041% | 99.930% |
| 62 | 0.027% | 99.957% |
| 63 | 0.017% | 99.974% |
| 64 | 0.010% | 99.984% |
| 65 | 0.006% | 99.991% |
| 66 | 0.004% | 99.995% |
| 67 | 0.002% | 99.997% |
| 68 | 0.001% | 99.998% |
| 69 | 0.001% | 99.999% |

Based on the PFA of 0.05; the critical boundaries are computed to be $y_1=27$ and $y_2=53$. These values are virtually the same as found for the ninety-five percent CI for the large sample approximate z test (27, 52) in Method D. These values also provide evidence that the computations are consistent as well as evidence that the Gaussian z test is adequate. Since m=39 and $y_1 < 39 < y_2$; then the null hypothesis of noise only is accepted. The number of non-empty cells in the one hundred and twenty-five partitioned space is consistent with a Poisson random distribution.

The protection against a Type I error is found by calculating the sum of Pr $(Y \leq y_1)$+Pr $(Y \geq y_2)$=0.02036+0.01888=0.039 which is approximately twenty-five percent higher than the a priori value of $\alpha$=0.05. This significance level represents the actual probability of incorrectly labeling this waveform signal. The difference 1-[Pr($Y \leq y_1$)+Pr($Y \geq y_2$)]=0.961 is the confidence that the operator has when deciding that noise is the correct decision. For example: Pr(Noise|Noise). Considering the data from the exact Poisson hypothesis test, the noise-only decision is reasonable. The results are consistent with the large-sample method of Method D but provide a higher degree of confidence.

Alternative Testing Procedure for the Signal-Noise Hypothesis
(Estimate of p)

In the case of the continuous Gaussian distribution, the p value from the large-sample z test in Equation (16) is relatively easy to compute because of the mirror symmetry of the distribution about the mean. Expressing the derivation of the Gaussian p measure in conceptual terms of areas where z is the assumed calculated value in Equation (4):
By definition, $$p = \frac{1}{\sqrt{2\pi}} \int_{-\infty}^{-z} \exp(-.5x^2) dx + \frac{1}{\sqrt{2\pi}} \int_{z}^{\infty} \exp(-.5x^2) dx.$$

Then, rearranging $$p = 1 - \left( \frac{1}{\sqrt{2\pi}} \int_{-z}^{0} \exp(-.5x^2) dx + \frac{1}{\sqrt{2\pi}} \int_{0}^{z} \exp(-.5x^2) dx \right) = \quad (24)$$

$$1 - \left[ \left( .5000 - \frac{1}{\sqrt{2\pi}} \int_{-\infty}^{-z} \exp(-.5x^2) dx \right) + \left( \frac{1}{\sqrt{2\pi}} \int_{-\infty}^{-z} \exp(-.5x^2) dx - .5000 \right) \right] =$$

$$1 - \left[ \frac{1}{\sqrt{2\pi}} \int_{-\infty}^{z} \exp(-.5x^2) dx - \frac{1}{\sqrt{2\pi}} \int_{-\infty}^{-z} \exp(-.5x^2) dx \right] =$$

$$1 - [Pr(Z \leq z) - Pr(Z \leq z)]$$

which leads to the computational form of Equation (4).

In a similar fashion, an estimate for p was derived for the discrete Poisson distribution. The algorithm of Equation (27) is used for estimating p in the small sample Poisson distribution test when the mean k9 >10 (approximating a symmetric Gaussian distribution).

The procedural steps are to first, consider any observed y value in Table 6 (which is assumed less than or equal to the mean k9) to be a lower limit called $^yL$. Second, assume that the mean k9 has a theoretical cumulative probability, Pr(Y≤k9)=0.50000 (or the area up to the mean is one-half of the total area of the probability mass) as in the Gaussian case. This is a basic but untestable assumption. However, by linear interpolation, on the interval about the mean [39, 40] by cumulative percent:

$$y = 39 + \frac{.50000 - .48789}{.55082 - .48789}(40 - 39) = 39.192 \quad (25)$$

the theoretical value of y that is half-way in Table 6.

This calculation differs from the actual Poisson mean k9=39.86 by only 1.7 percent. Alternate estimation procedures such as geometric mean averaging leads to no more than a 1.8 percent difference. Thus, the assumption appears to be reasonable for large k9 values and is used in the estimation procedure.

Third, a value is found that is equidistant above the mean $y_u$ to represent the upper and approximate equi-probable outcome of the experiment for a two-sided signal and noise hypothesis. The difference in the cumulative probabilities of $y_L$ and $y_u$ with respect to the mean k9=39.86 will be the estimate of p—analogous to Equation (24). The values $y_L$ and $y_u$ roughly symmetric with respect to the mean. The input value determined as $y_L$ or $y_u$ by comparison to k9.

The lower/upper y values and p are determined in the following manner for the case of y either above or at/below the mean k9:

| UPPER BOUND DETERMINATION $y_u$ | LOWER BOUND DETERMINATION $y_L$ |
|---|---|
| $y \leq k\vartheta$ | $y > k\vartheta$ |
| $\mu = \text{int}(k\vartheta)$ | $\mu = \text{int}(k\vartheta)$ |
| $y = y_L$ | $y = y_u$ |
| $y_u = \mu + \|\mu - y_L\|$ | $y_L = \mu - \|y_u - \mu\|$ |
| $p = 1 - \left[\frac{1}{2} - Pr(Y \leq y_L) + Pr(Y \leq y_u) - \frac{1}{2}\right]$ | $p = 1 - \left[\frac{1}{2} - Pr(Y \leq y_L) + Pr(Y \leq y_u) - \frac{1}{2}\right]$ |
| $p = 1 - [Pr(Y \leq y_u) - Pr(Y \leq y_L)]$ | $p = 1 - [Pr(Y \leq y_u) - Pr(Y \leq y_L)]$ |

(26)

where "int" is an integer operator defined as the integer part of a real number and where $|\bullet|$ is the absolute value. The first term $\mu=\text{int}(k\vartheta)$ will be only the whole number. For example: $\text{int}(39.86)=39=\mu$. The second term is the absolute value of the difference between the mean $\mu$ and the values $y_L$ and $y_u$.

Applying the algorithm of Equation (26) to the case for the experimental observed value y=m=39; non-empty partitions in Table 4 provide an estimate of p in order to test the null hypothesis of noise only:

$$y = m = y_L = 39 \tag{27}$$

$$\mu = 39$$

$$y_u = 39 \text{ (since} |\mu - y_L| = 0)$$

$$p = 1 - [.5000 - Pr(Y \leq 39) + Pr(Y \leq 39) - .5000]$$
$$= 1 - [Pr(Y \leq 39) - Pr(Y \leq 39)] = 1.00$$

The probability that y=m=39 indicates noise is 1.00. Using the nominal level of significance $\alpha=0.05$ then since $1.00 \geq \alpha \Rightarrow$ NOISE; the operator can conclude that this time waveform contains virtually no signal information. To validate this value against the Gaussian calculation, use Equation (16) with m set to y but apply a quantized value of +0.5 to the numerator. For example:

$$z = \frac{39 - k\vartheta + .5}{\sqrt{k\vartheta}} = -0.06. \tag{28}$$

Then, compute the p value from Equation (4) for the observed z-test value. This value is found to be p=0.95. If z were 0; p would be 1.00 by Equation (4).

The rule of the present method for applying the quantized continuity correction factor is: if $y-k\vartheta \leq 0$, add +0.5—and if $y-k\vartheta > 0$, add −0.5. The algorithm appears acceptable if applied to selected values of y in Table 6 and compared to the Gaussian distribution.

For example: the likelihood that y was observed to be twenty is, $$y = y_L = 20 \tag{29}$$

$$\mu = 39$$

$$y_u = 39 + |39 - 20| = 58$$

$$p = 1 - [.5000 - Pr(Y \leq 39) + Pr(Y \leq 58) - .5000] =$$
$$1 - [Pr(Y \leq 58) - Pr(Y \leq 20)] = 1 - [.99731 - .00040] = .003$$

The probability is only 0.003 that the number of non-empty partitions is twenty (20). This appears reasonable since twenty (20) is an extreme value compared to the mean 39.86, indicative of noise. The Gaussian p calculation with the continuity correction factor of +0.5 for y=20 is the same (p=0.003).

Another example: if y=27, the likelihood of that value can estimated by the algorithm:

$$y = y_L = 27 \tag{30}$$

$$\mu = 39$$

$$y_u = 39 + |39 - 27| = 51$$

$$p = 1 - [.5000 - Pr(Y \leq 27) + Pr(Y \leq 51) - .5000] =$$
$$1 - [Pr(Y \leq 51) - Pr(Y \leq 27)] = 1 - [.96319 - .02036] = .057$$

Compared to the Gaussian calculation with the continuity correction factor of +0.5 for y=27, p=0.05.

Lastly, if y=53; the Poisson p can be estimated by the algorithm:

$$y = y_U = 53 \tag{31}$$

$$\mu = 39$$

$$y_L = 39 - |53 - 39| = 25$$

$$p = 1 - [.5000 - Pr(Y \leq 25) + Pr(Y \leq 53) - .5000] =$$
$$1 - [Pr(Y \leq 53) - Pr(Y \leq 25)] = .027$$

The p for the Gaussian is 0.046 with the continuity correction factor of −0.5.

The algorithm for estimating p to test the two-tailed signal-noise hypothesis is workable as validated against the Gaussian distribution. Overall, the differences of the p values (Poisson and Gaussian) are small.

To further validate the derived process, the algorithm in Equation (26) is applied to other Poisson distributions with means as low as 10-15. The means of those distributions differ from the interpolated means by no more than 4.4 percent. This percentile is an adequate tolerance level with which to compute p values to test the signal-noise hypothesis. When the mean is approximately one hundred (100) then only a 0.96 percent difference exists. At a mean of five hundred (500), the difference is down to 0.20 percent and continues to decrease with higher values of the Poisson mean.

Consequently, the algorithm is incorporated into the present method when the sample mean $k\vartheta > 10$ regardless of the sample size. When the mean does not meet the criteria of $k\vartheta > 10$, the p value cannot be estimated by Equation (26) due to the high asymmetry of such distributions. The two-tailed signal-noise hypothesis must be evaluated in the standard manner using the DECISION RULE, under HYPOTHESIS.

Employing the algorithm of Equation (2%) indicates that an alternate way to assess the signal and noise hypothesis involves comparing the estimated p to the approximate PFA by the rule adopted: $p \geq \alpha \Rightarrow$ NOISE; $p < \alpha \Rightarrow$ SIGNAL+NOISE. That procedure would result in a faster solution.

Note that in the foregoing, the data derived from the Poisson frequency distribution (Table 4) of Method E has been used to illustrate the testing procedures for Method D. Those computations provided forty-eight (48) as the sample size based on the approximate procedure modeled on the formalism provided by the Feller reference (Chapter 6). In the alternative, if Method E is not implemented; the operator may use the actual sample size of fifty points (50) to carry out the computations for testing the signal-noise hypothesis. This has the effect of using the mean:

$$k\vartheta = 125\left[1 - \exp\left(-\frac{50}{125}\right)\right] = 41.21 \quad (32)$$

Compared to $k\vartheta = 39.86$ computed from Equation (20).

That is, Table 6 would be based on 41.21 instead of 39.86. All numerical results would change slightly, but the conclusions will not differ in regard to determining that the input time waveform is noise.

In conclusion, the fifty point pseudo-random distribution in Table 4 has been analyzed with the testing procedures of the present invention. Each test has given the same result which is random noise.

FIG. 2 and FIG. 3A-3C diagrammatically show the steps of the embodiment of data characterization method 50 and the embodiment of data characterization method 100.

Figure 2:
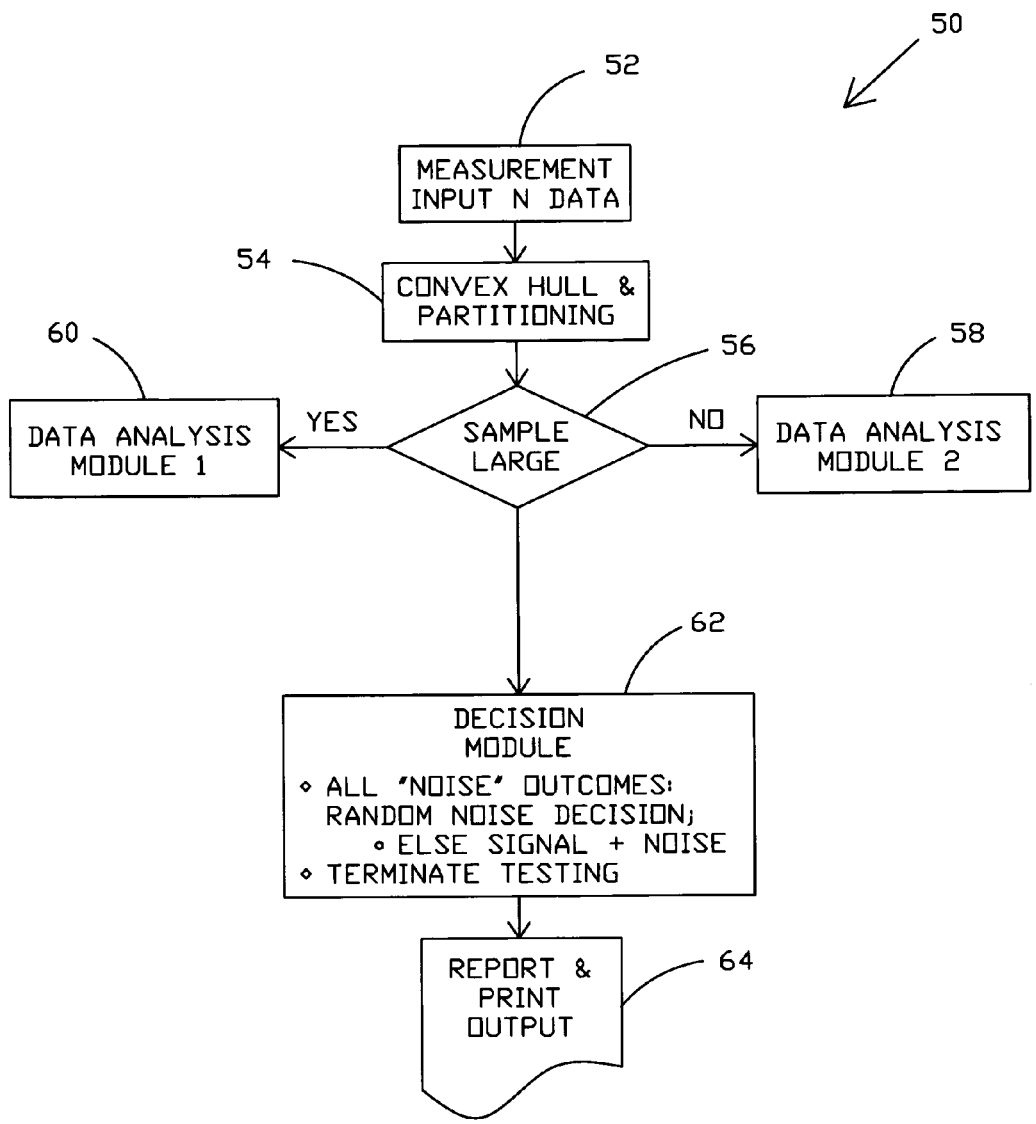
FIG. 2 is a flow diagram for a method to characterize data sets in accordance with the present invention.

In FIG. 2, in support of the data characterization method 50, step 52 provides a measurement input of data based on a plurality of measurements of physical phenomena, such as sonar, medical imaging, or the like.

For example: step 52 comprises reading input data vectors $\{t, y, z\}$ where t is clock time and x, y are amplitude measures in the time domain. This step may also comprise performing pre-processing conditioning, filtering, formatting, and selecting a discrete sample size N.

Step 54 comprises forming a three-dimensional convex hull over the data. The data is then partitioned into volumes based on a partitioning algorithm—as previously described (See Method 1-4). The convex hull can average approximately fifty-two percent of the containing region formed by the t, y, z volume; thereby, providing a significant increase in processing speed as compared to the prior art.

In step 56, a determination is made as to whether the sample size is large or small. While presently preferred embodiments for this value (N>25) have been given hereinbefore, it will be understood that parameters can be selected which may vary. Thus, if the number of data elements is greater than a selected parameter, range of parameters, formulae based on parameters; then the sample size is considered large. If not, then the sample size is considered small.

Based on the determination made in step 56, a set of tests are utilized for a small sample size as indicated at data analysis module 58 or a large sample as indicated at data analysis module 60. Decision module 62 states that tests are conducted and followed by an "all or nothing" decision rule. If all accepted tests indicate random noise, then that is the determination. Otherwise, the determination is to be a signal plus noise.

For LARGE SAMPLE TEST MODULE: N>25 as indicated at step 56, then the following tests comprise one possible presently preferred embodiment of: a Runs Test; a R Ratio; a Correlation Module; a Normal Approximate z-Test/ Confidence Interval (CI) Analysis; a Chi-square Test (alternative); a Nonlinear correlation and other correlation techniques (alternative).

For SMALL SAMPLE TEST MODULE: N 25 as indicated at step 56, then the following tests comprise one possible embodiment: a Runs Test; a R Ratio; a Correlation Module; and a Poisson Probability Test. One possible and presently preferred order of the testing protocol is:

| | Large Sample (Data Analysis Module 60) |
|---|---|
| TEST ORDER | TESTING PROCEDURE |
| First | Wald-Wolfowitz Runs test for independent samples |
| | Normal approximation |
| | Exact probability computation |
| Second | Correlation Method |
| | Linear R |
| | Serial Correlation (Autocorrelation) |
| | Correlogram |
| Third | R Ratio and Confidence Interval (CI) Analysis |
| Fourth | Normal Approximations z - Test for Poisson distribution on the number of non-empty partitions |
| | Exact Poisson Distribution Hypothesis Test (alternative) |
| alternative | Chi-square Test of Homogeneity |
| alternative | Nonlinear and other correlational techniques |

NOTE: Testing continues while either noise is the current decision or one signal instance is detected.

| | Small Sample (Data Analysis Module 58) |
|---|---|
| TEST ORDER | TESTING PROCEDURE |
| First | Wald-Wolfowitz Runs test for Independent Samples (Exact test) |
| Second | Correlation Method |
| | Linear R |
| | Serial Correlation (Autocorrelation) |
| | Correlogram |
| Third | R Ratio and Confidence Interval Analysis |
| Fourth | Exact Poisson Distribution Hypothesis Test |
| | Standard Approach |
| | Significance probability |

NOTE: Testing continues while either noise is the current decision or one signal instance is detected.

As indicated at step 62 of the decision module; if all test results indicate noise then the data is considered to be random. If any test indicates nonrandom; then the data contains signal information.

As indicated at step 64, reports may comprise outputs of analysis results in summary form, archiving (graphics and text) and the next window of data to be processed.

Figure 3A:
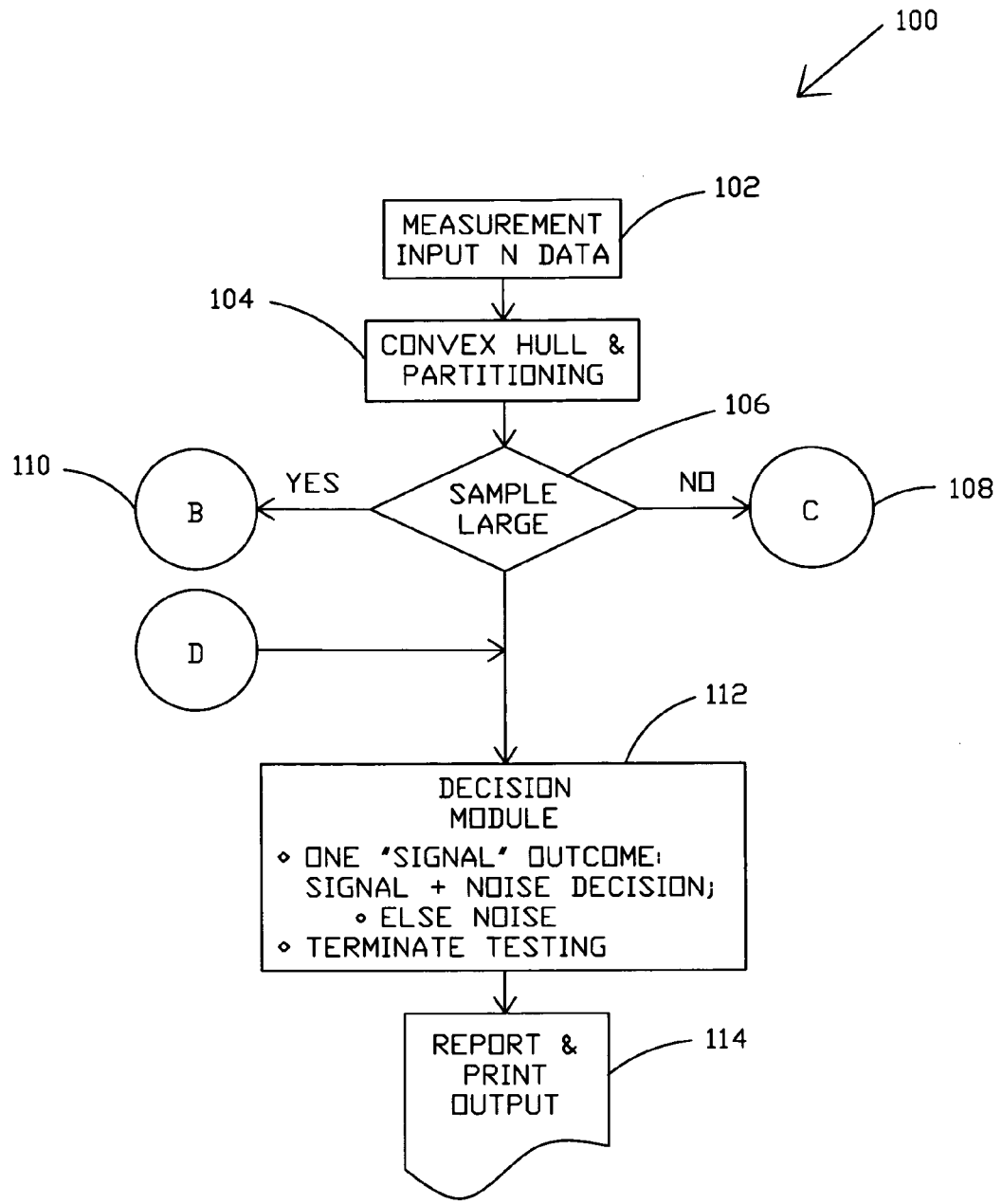
FIG. 3A-3C are flow diagrams for the method to characterize data sets in accordance with the present invention.

In regard to FIG. 3A, steps 102, 104, 106, 108, 110, 112, and 114 of data characterization method 100 correspond to the previously discussed steps 52, 54, 56, 58, 60, 62, and 64 of FIG. 2. However, the characterization method 100 provides that testing continues while noise is the present conclusion.

Figure 3B:
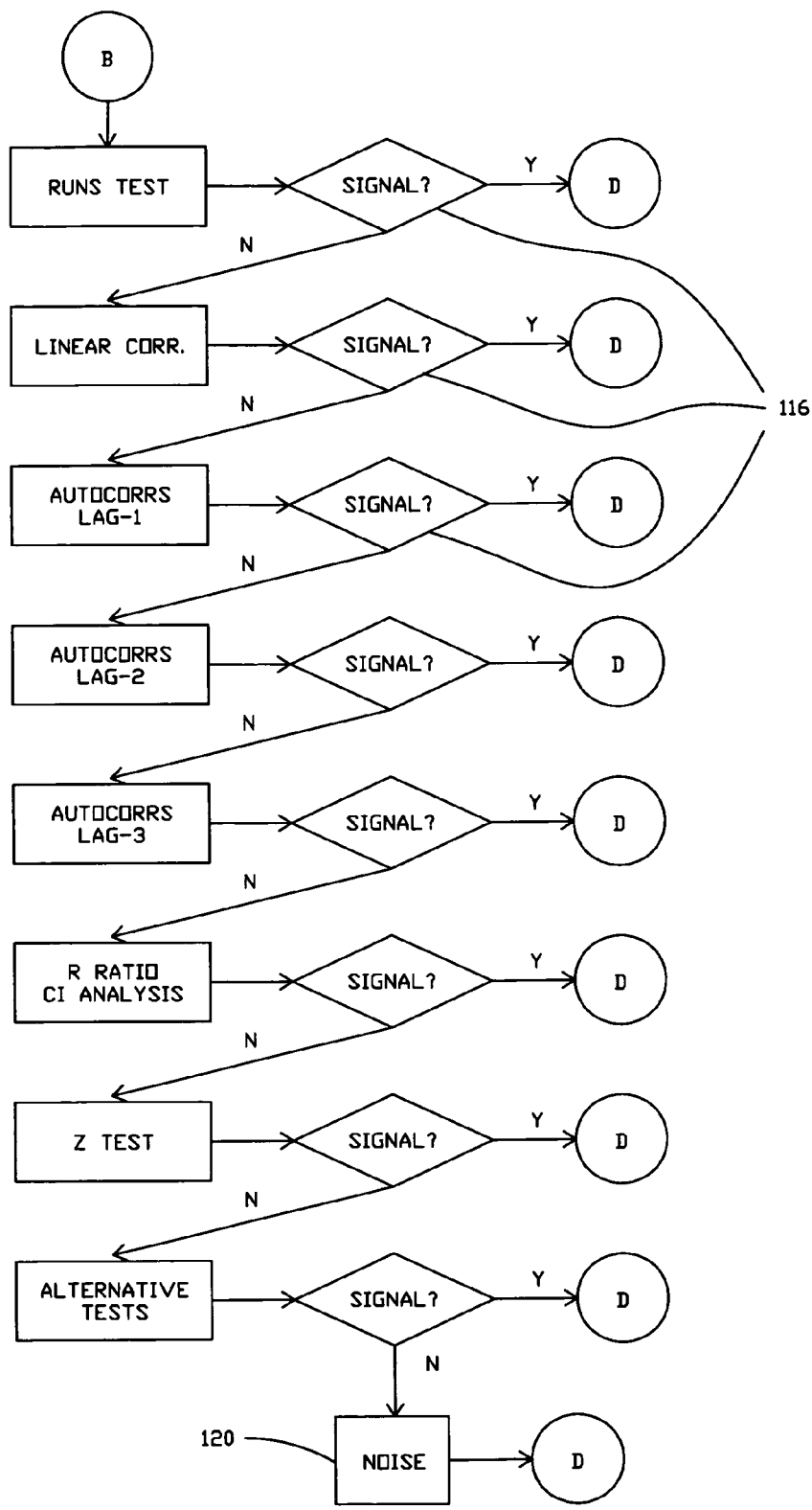
Figure 3C:
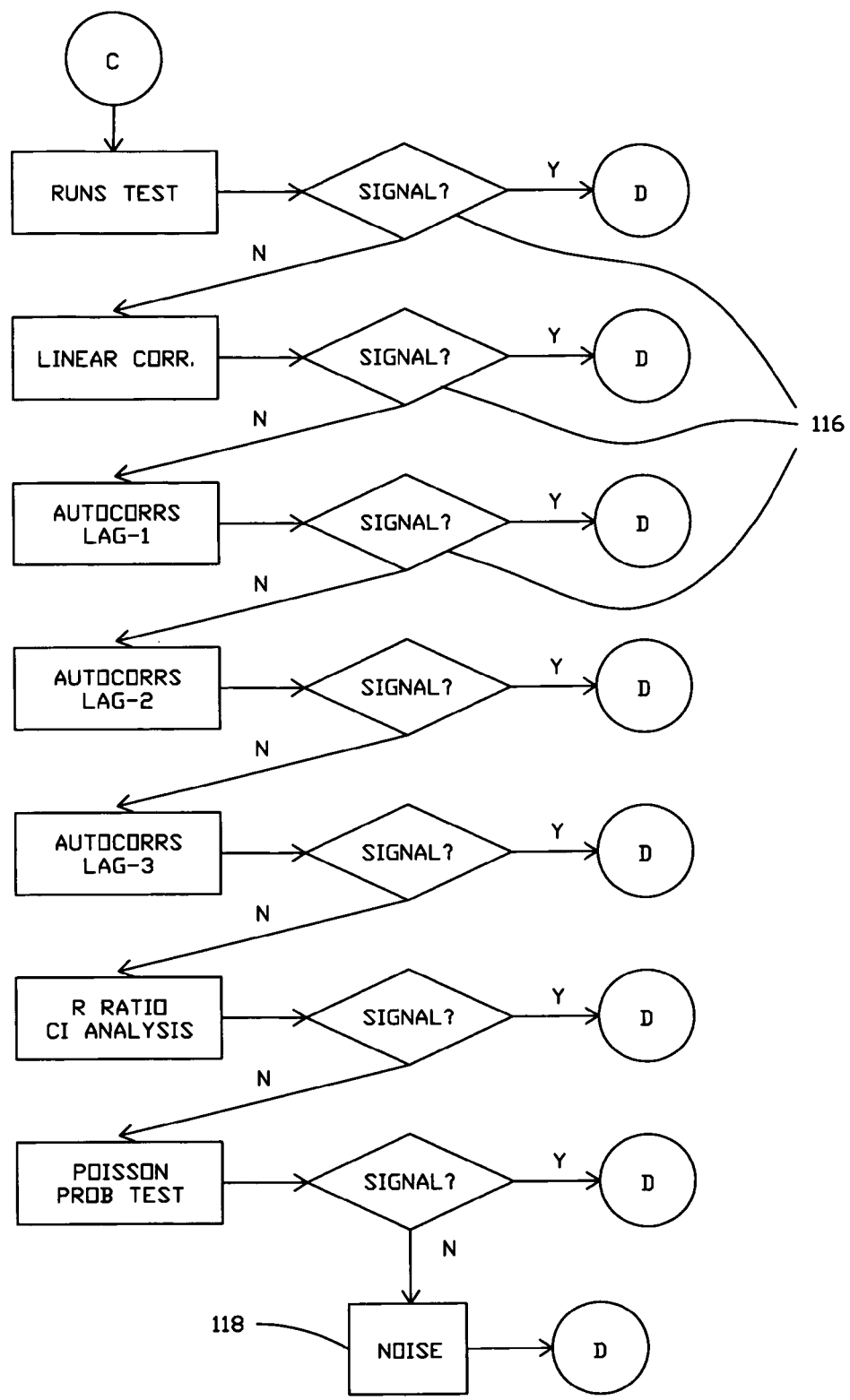

Referring to FIGS. 3B and 3C, logic tests 116 are provided after each test; whereby, if any test determines that a signal is present (for example: the data is not random noise). At that time, the testing is terminated with a determination of a signal by the decision module 112.

Alternatively, if all tests characterize the data set as noise, then the method produces a characterization of the data set as noise as indicated at 120 shown in FIGS. 3B and 118 shown in FIG. 3C. As discussed hereinbefore with the data characterization method 50; testing is conditional upon the size of the sample. The sample dictates the testing procedures used to evaluate the signal and noise hypotheses.

One utility of the present method is in the field of signal processing and other data processing fields in which it is of interest to know whether the measurement structure is random in the presence of potentially highly sparse data sets contained in a compact volume. The method provides a faster solution for randomness determination than prior art methods.

A significant new feature is an explicit method to handle very small samples by means of a polygon envelope; thereby, creating a more concentrated region for analysis. The calculation of the significance probability (as discussed hereinbefore for small samples) constitutes another novel, useful and non-obvious feature. The present inventive method can most likely be adopted for two-dimensional data sets in order to identify and filter Poisson noise. Finally, a four-dimensional time series analysis can be performed if measures $\{x, y, z\}$ are captured at discrete time intervals t.

Various alternatives to the above-discussed methods are possible. Another example, during partitioning, another step may comprise establishing a criterion for eliminating or reducing the amount of non-whole cubic subspaces from the analysis. For example: eliminate subspace segments that are less than one-half to three-quarters of the size of the volume t. The sample size is reduced with this criterion. For small samples, this may lower the power of the testing procedures although the probability assumptions will be less violated.

During analysis, a Chi-square test for homogeneity (large samples) and the nonlinear correlation may be utilized. In addition, the small sample Poisson probability test can be used in place of the large sample approximate test since exact probabilities will be provided regarding the signal-noise hypothesis. The autocorrelation functions (ACF) may be computed for as many lags as possible.

For non-time series data, many variable-relational techniques are known to those skilled in the art, including multivariate nonlinear curve fitting, partial correlation, canonical correlation analysis, pattern recognition, image processing, feature extraction, and other multivariate data reduction techniques. However, these are large sample methods that require significant analyst input in the interpretation of outcomes. In the decision module, testing may contain as many procedures as needed to provide confidence to the operator that the data are a noise or a signal.

The improved methodology over the prior art of this field can be applied to the two-dimensional case for noise identification and filtering. Moreover, the inventive method can be applied to four-dimensional structures with time t concomitant with measures $\{x, y, z\}$.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for characterizing a plurality of data sets as random noise for use in a sonar system, the data sets being based on a plurality of measurements of a physical phenomena, said method comprising the steps of:
    inputting data points from a first data set of the plurality of data sets;
    creating a three-dimensional convex hull enclosing the data points of the first data set;
    ensuring that the convex hull comprises a three-dimensional curvature that passes through at least four non-coplanar data points from the first data set;
    partitioning the three-dimensional convex hull into a plurality of three-dimensional cells;
    classifying the first data set as a sized sample based on a selected parameter;
    utilizing a first plurality of tests for the first data set as being random noise when the first data set is classified as a large sized sample; and
    utilizing a second plurality of tests for characterizing the first data set as being random noise when the first data is classified to be a small sized sample.

2. The method of claim 1, wherein said step of partitioning the convex hull into the plurality of three dimensional cells comprises utilizing at least one of terms $$\sqrt[3]{\frac{V}{k}}, \sqrt[3]{\frac{V_p}{N}}, \text{ and } \sqrt[3]{\frac{V}{N}},$$

wherein $V_p$ is a volume of the convex hull, N is the number of points and k is a value at least partially based on N.

3. The method of claim 2, wherein said step of utilizing the second plurality of tests comprises determining a significance probability value for the small sample for a two-tailed hypothesis of a quasi-symmetric finite discrete Poisson probability distribution.

4. The method of claim 3, comprising the step of utilizing at least a Runs test, a correlation test, an R ratio and confidence interval analysis and a normal approximations z-test for a Poisson distribution on a number of non-empty of the plurality of cells for the first plurality of tests and performing the first plurality of tests sequentially in a predefined order.

5. The method of claim 4, comprising the step of utilizing at least a Runs test, a correlation test, an R ratio and confidence interval analysis and a normal approximations z-test for a Poisson distribution on a number of non-empty of the plurality of cells for the second plurality of tests and performing the second plurality of tests sequentially in a predefined order.

6. The method of claim 5, wherein said step of utilizing a second plurality of tests comprises characterizing the first data set as comprising a signal.

7. The method of claim 6, wherein said step of characterizing of the first data set as random noise ends after any one of either of the plurality of tests indicates that the first data set comprises the signal.

8. The method of claim 5, wherein said step of utilizing the first plurality of tests for the first data set as comprising a signal when the first data set is classified as a large sized sample.

9. The method of claim 8, wherein said step of characterizing of the first data set as random noise ends after any one of either of the plurality of tests indicates that the first data set comprises the signal.

\* \* \* \* \*

UNITED STATES PATENT AND TRADEMARK OFFICE
CERTIFICATE OF CORRECTION

PATENT NO. : 8,693,288 B1  
APPLICATION NO. : 13/317035  
DATED : April 8, 2014  
INVENTOR(S) : Francis J. O'Brien, Jr. and Aimee M. Ross It is certified that error appears in the above-identified patent and that said Letters Patent is hereby corrected as shown below:

In the Specification

Column 6, line 5, change $\sqrt[3]{\frac{V_p}{N}}$ to $\sqrt[3]{\frac{V}{N}}$

Column 9, line 14, change Pr(ejectH$_0$|H$_0$ = True) to Pr(rejectH$_0$|H$_0$ =True)

Column 17, line 42, change NOTE: $n_0 = N - \Sigma_{k=1}^{k=K} n_k$ (zero bin is calculated last). to NOTE: $n_0 = N - \sum_{k=1}^{k=K} n_k$ (zero bin is calculated last).

Column 18, line 67, change (8)] to 11)]

Column 20, line 7, change $f(\chi^2_{11})$ to $f(\chi^2_v)$

Column 23, line 27, change $Pr(Y \leq y) = 1 - \sum_{y=0}^{y_2} P(y; k\vartheta)$ to $Pr(Y \geq y) = 1 - \sum_{y=0}^{y_2} P(y; k\vartheta)$ Column 23, line 46, add a "." after result Column 23, line 46, delete "(See the discussion for Table A)."

Column 24, line 35, change Table 6 header from Poisson Distribution Probability Table for $k\vartheta$ 39.86;$m = 39$  
Note: $k9$ should be $k\vartheta =$ Signed and Sealed this  
Seventh Day of July, 2015

Michelle K. Lee  
*Director of the United States Patent and Trademark Office* to Poisson Distribution Probability Table for $k\vartheta = 39.86; m = 39$

Column 25, line 2, change Table 6 header-continued from Poisson Probability Distribution for k9 39.86 to $k\vartheta = 39.86; m = 39$ Column 26, line 21, change The algorithm of Equation (27) to The algorithm of Equation (26)

Column 26, line 29, change $^y$L. to $y_L$

Column 29, line 10, change 2% to 26